US010031822B2

(12) United States Patent
Dimnaku et al.

(10) Patent No.: US 10,031,822 B2
(45) Date of Patent: Jul. 24, 2018

(54) TECHNIQUES FOR ESTIMATING ABILITY OF NODES TO SUPPORT HIGH AVAILABILITY FUNCTIONALITY IN A STORAGE CLUSTER SYSTEM

(71) Applicant: NETAPP, INC., Sunnyvale, CA (US)

(72) Inventors: Alma Dimnaku, Wellesley, MA (US); Curtis Hrischuk, Morrisville, NC (US); Kevin Faulkner, Westford, MA (US)

(73) Assignee: NETAPP, INC., Sunnyvale, CA (US)

( * ) Notice: Subject to any disclaimer, the term of this patent is extended or adjusted under 35 U.S.C. 154(b) by 73 days.

(21) Appl. No.: 15/141,357

(22) Filed: Apr. 28, 2016

(65) Prior Publication Data
US 2017/0220433 A1    Aug. 3, 2017

Related U.S. Application Data

(60) Provisional application No. 62/288,921, filed on Jan. 29, 2016.

(51) Int. Cl.
*G06F 11/00* (2006.01)
*G06F 11/20* (2006.01)

(52) U.S. Cl.
CPC .... *G06F 11/2033* (2013.01); *G06F 2201/805* (2013.01)

(58) Field of Classification Search
CPC .......... G06F 11/2033; G06F 2201/805
See application file for complete search history.

(56) References Cited

U.S. PATENT DOCUMENTS

| 6,192,470 | B1 | 2/2001 | Kelley et al. |
| 6,263,382 | B1 | 7/2001 | Bartlett et al. |
| 7,613,947 | B1 * | 11/2009 | Coatney .............. G06F 11/0727 714/6.1 |
| 7,664,798 | B2 | 2/2010 | Wood et al. |
| 7,707,015 | B2 | 4/2010 | Lubrecht et al. |
| 8,010,337 | B2 | 8/2011 | Narayanan et al. |
| 8,244,868 | B2 | 8/2012 | La Frese et al. |

(Continued)

OTHER PUBLICATIONS

Non-Final Office Action on co-pending U.S. Appl. No. 14/994,009 dated Nov. 21, 2017.

(Continued)

*Primary Examiner* — Bryce P Bonzo
*Assistant Examiner* — Jonathan D Gibson
(74) *Attorney, Agent, or Firm* — Klein, O'Neill & Singh, LLP

(57) ABSTRACT

Various embodiments are generally directed to techniques for determining whether one node of a HA group is able to take over for another. An apparatus includes a model derivation component to derive a model correlating node usage level to node data propagation latency through and to node resource utilization from a first model of a first node of a storage cluster system and a second model of a second node of the storage cluster system, the first model based on a first usage level of the first node under a first usage type, and the second model based on a second usage level of the second node under a second usage type; and an analysis component to determine whether the first node is able to take over for the second node based on applying to the derived model a total usage level derived from the first and second usage levels.

22 Claims, 18 Drawing Sheets

(56) References Cited

U.S. PATENT DOCUMENTS

| | | | |
|---|---|---|---|
| 8,260,622 B2 | 9/2012 | Chron et al. | |
| 8,274,909 B2 | 9/2012 | Harvell et al. | |
| 8,412,672 B1* | 4/2013 | Radhakrishnan | H04L 67/1097 707/609 |
| 8,531,954 B2 | 9/2013 | McNaughton et al. | |
| 8,738,972 B1 | 5/2014 | Bakman et al. | |
| 8,874,954 B1* | 10/2014 | Gupte | G06F 11/2028 714/1 |
| 9,009,296 B1 | 4/2015 | Siganporia et al. | |
| 9,063,939 B2* | 6/2015 | Dalton | G06F 17/30079 |
| 9,128,965 B1 | 9/2015 | Yanacek et al. | |
| 9,444,711 B1 | 9/2016 | Siganporia et al. | |
| 9,645,901 B2* | 5/2017 | Nagaraj | G06F 11/2038 |
| 9,830,238 B2* | 11/2017 | Mu | G06F 11/2092 |
| 2002/0049845 A1* | 4/2002 | Sreenivasan | H04L 69/40 709/226 |
| 2002/0152305 A1 | 10/2002 | Jackson et al. | |
| 2006/0074970 A1 | 4/2006 | Narayanan et al. | |
| 2006/0161883 A1* | 7/2006 | Lubrecht | G06Q 10/06 717/104 |
| 2006/0168272 A1 | 7/2006 | Rustad et al. | |
| 2007/0283016 A1 | 12/2007 | Pendarakis et al. | |
| 2008/0059972 A1 | 3/2008 | Ding et al. | |
| 2010/0075751 A1 | 3/2010 | Garvey et al. | |
| 2010/0232288 A1* | 9/2010 | Coatney | G06F 11/2033 370/221 |
| 2010/0262710 A1 | 10/2010 | Khatib et al. | |
| 2010/0313203 A1 | 12/2010 | Dawson et al. | |
| 2011/0197027 A1 | 8/2011 | Balasubramanian et al. | |
| 2011/0225362 A1 | 9/2011 | Leggette | |
| 2012/0011517 A1 | 1/2012 | Smith et al. | |
| 2012/0084270 A1* | 4/2012 | Jayaraman | G06F 17/30156 707/692 |
| 2012/0137002 A1 | 5/2012 | Ferris et al. | |
| 2013/0124714 A1 | 5/2013 | Bednar | |
| 2013/0159548 A1 | 6/2013 | Vasseur et al. | |
| 2013/0173804 A1 | 7/2013 | Murthy et al. | |
| 2013/0204960 A1 | 8/2013 | Ashok et al. | |
| 2013/0227111 A1* | 8/2013 | Wright | G06F 9/5083 709/223 |
| 2013/0304903 A1 | 11/2013 | Mick et al. | |
| 2014/0068053 A1 | 3/2014 | Ravi et al. | |
| 2014/0095696 A1 | 4/2014 | Sala et al. | |
| 2014/0165060 A1 | 6/2014 | Muller et al. | |
| 2014/0372607 A1 | 12/2014 | Gladwin et al. | |
| 2015/0006733 A1 | 1/2015 | Khan et al. | |
| 2015/0095892 A1 | 4/2015 | Baggott et al. | |
| 2015/0235308 A1 | 8/2015 | Mick et al. | |
| 2015/0295827 A1 | 10/2015 | Zhu et al. | |
| 2016/0065492 A1 | 3/2016 | Hu et al. | |
| 2016/0112275 A1 | 4/2016 | Park et al. | |
| 2016/0173571 A1 | 6/2016 | Bragstad et al. | |
| 2017/0201580 A1 | 7/2017 | Dimnaku et al. | |

OTHER PUBLICATIONS

Final Office Action on related U.S. Appl. No. 14/805,770 dated Jun. 14, 2017.
Notice of Allowance on related U.S. Appl. No. 14/805,851 dated Aug. 31, 2016.
Office Action on related U.S. Appl. No. 14/805,829 dated Nov. 8, 2016.
Notice of Allowance on related U.S. Appl. No. 14/805,829 dated Jan. 4, 2017.
Office Action on co-pending U.S. Appl. No. 14/805,770 dated Jan. 23, 2017.
Non-Final Office Action on co-pending U.S. Appl. No. 14/805,804 dated May 5, 2017.
Final Office Action on co-pending U.S. Appl. No. 14/805,804 dated Oct. 6, 2017.
Non-Final Office Action on co-pending U.S. Appl. No. 14/805,770 dated Dec. 20, 2017.
Non-Final Office Action on co-pending U.S. Appl. No. 15/071,917 dated Dec. 1, 2017.
Notice of Allowance on co-pending U.S. Appl. No. 14/805,804 dated Jan. 19, 2018.
Non-Final Office Action on co-pending U.S. Appl. No. 15/098,007 dated Apr. 12, 2018.
Non-Final Office Action on co-pending U.S. Appl. No. 15/090,878 dated Dec. 22, 2017.
Final Office Action on co-pending U.S. Appl. No. 15/090,878 dated May 18, 2018.
Notice of Allowance on co-pending U.S. Appl. No. 15/071,917 dated May 25, 2018.
Final Office Action on co-pending U.S. Appl. No. 14/994,009 dated Jun. 8, 2018.

* cited by examiner

3100

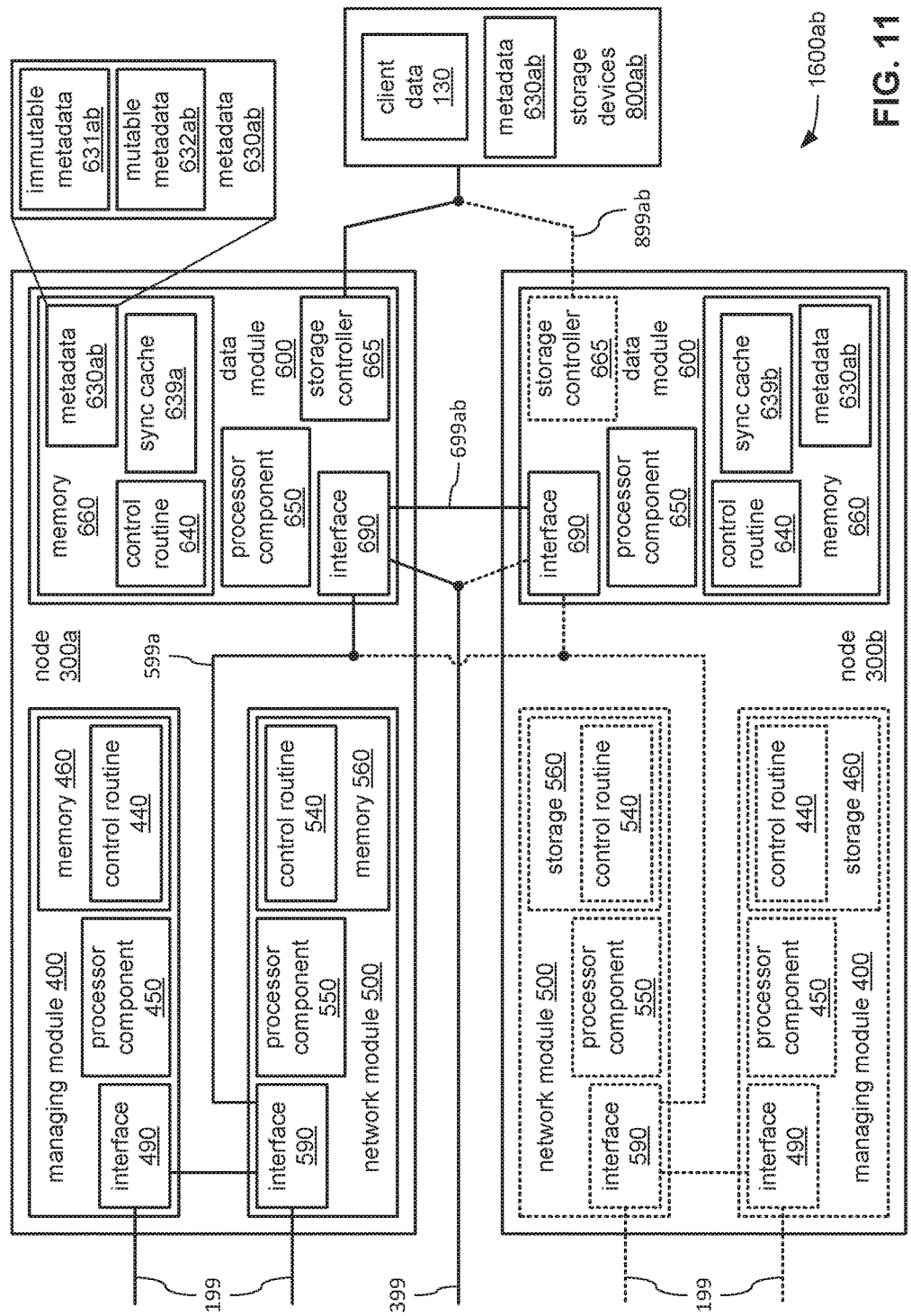

4000

… (1)

TECHNIQUES FOR ESTIMATING ABILITY OF NODES TO SUPPORT HIGH AVAILABILITY FUNCTIONALITY IN A STORAGE CLUSTER SYSTEM

CROSS-REFERENCE TO RELATED APPLICATIONS

This application claims the benefit of priority under 35 U.S.C. § 119(e) to U.S. Provisional Application Ser. No. 62/288,921 entitled "TECHNIQUES FOR ESTIMATING ABILITY OF NODES TO SUPPORT HIGH AVAILABILITY FUNCTIONALITY IN A STORAGE CLUSTER SYSTEM" filed Jan. 29, 2016, the entirety of which is incorporated herein by reference.

BACKGROUND

Storage cluster systems may have multiple nodes that cooperate to provide fault tolerant storage, in part by maintaining identical copies of stored client data within separate storage devices that are each normally under the control of separate nodes. A feature of such storage cluster systems may be the ability to arrange for one node to continuously monitor and remain prepared to take over for another node on an occasion where that other node may suffer a malfunction or otherwise fail to function normally.

A node that takes over for another node takes over the performance of various functions that were performed by that other node, including storing client data within and/or retrieving client data from one or more storage devices that were under the control of the other node. Alternatively or additionally, the node that takes over for the other node may take over communications with one or more client devices from which requests to store and/or retrieve client data may be received, and to which responses may be required within a predetermined maximum period of time.

For one node to take over for another node, and thereby take on the performance of functions of that other node in addition to performing its own functions, the node that takes over for another node must have sufficient processing, memory, network bandwidth and/or other resource(s) to have sufficient "headroom" to successfully take over those functions of that other node. Approaches to determining whether a node has such headroom available are usually oversimplified to the extent of achieving inaccurate and/or otherwise unusable results.

BRIEF DESCRIPTION OF THE DRAWINGS

FIG. 11 illustrates an example embodiment of a HA group of partnered nodes.

DETAILED DESCRIPTION

Figure 1:
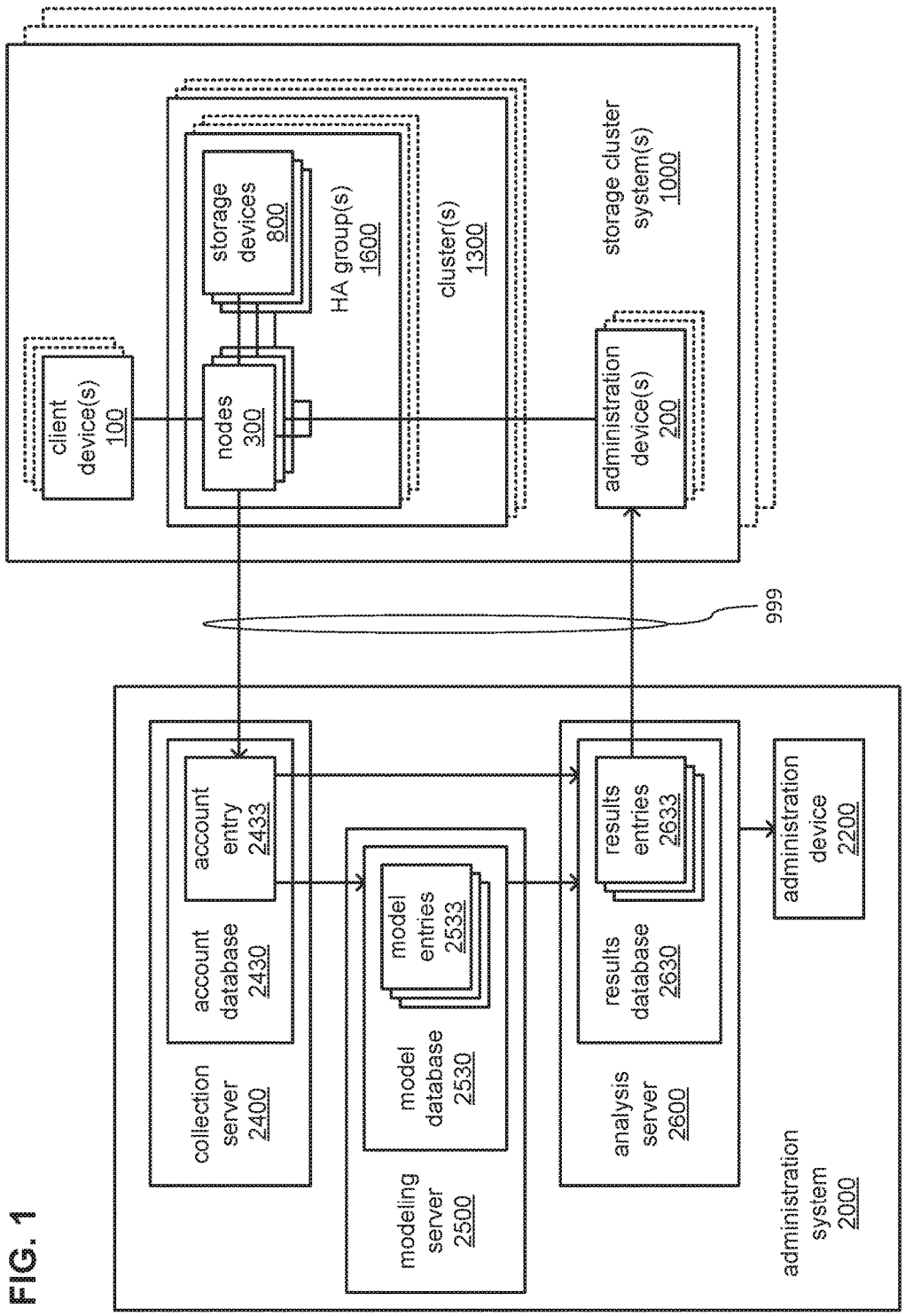
FIG. 1 illustrates an example embodiment of an administration system exchanging data with multiple storage cluster systems.

Various embodiments are generally directed to techniques for determining whether one node of a high-availability (HA) group of nodes has the necessary resources to take over the functions of another node of that HA group. Nodes of a storage cluster system may recurringly provide indications to an administration system of observed levels of different types of use correlated to various resulting levels of performance. The administration system may recurringly employ such indications to derive node models of such correlations for each type of node and/or each type of use, where each such model may be expressible as a graph of levels of utilization vs. latencies of data propagation through a range of levels of usage. The administration system may use such recurringly derived node models to recurringly check whether the levels and types of use to which each node in a HA group is currently subjected are such that each node in that HA group is still able to take over for another of the nodes that HA group in response to a failure in that other node. The administration system may store a record of the results of each such check over a relatively long period of time for each node and/or for each HA group of nodes, and may recurringly analyze such records of results to identify histories of results that exceed a threshold and/or that indicate a trend toward exceeding a threshold. The administration system may provide indications of the results of such recurring analyses, including graphical depictions of observed levels of use correlated to resulting levels of performance at times when a node of a HA group would not have been able to take over for another node to enable diagnoses of failures and/or the making of decisions of changes to storage cluster systems to better enable nodes of HA groups to take over for each other.

The administration system may be divided into one or more servers (implemented either physically or virtually) that may perform different aspects of the generation and use of node models as described herein. More specifically, a collection server of an administration system may recurringly receive, from the monitoring components of the nodes of at least one HA group of at least one storage cluster system, indications of current levels of usage, indications of types of usage at each usage level, and indications of levels of performance that are observed to result from each usage level under each usage type. The collection server may store such indications within an accounts database in which separate entries may be maintained for each node of a particular storage cluster system, for each storage cluster system, and/or for each organization that operates one or more storage cluster systems that include nodes from which such indications may be received.

A current level of usage may be indicated as a number of I/O operations (IOPs) performed per a unit of time (e.g., IOPs per second). The performance levels that result from each usage level under each usage type may be indicated as resulting levels of utilization of one or more resources provided by each node, resulting latencies of data propagation through each node, resulting levels of data throughput through each node, etc. Each usage type may be defined by a different combination of types of IOPs that are being performed (e.g., different combinations of read operations, write operations, copy operations, move operations, etc.). As a result, each of the different usage types may result in differing relative levels of utilization among different resources provided by a node, as well as differing levels of throughput and/or latencies. Thus, the collection server may store the indications received from the monitoring components of the nodes of at least one HA group of a storage cluster system in a manner in which they are differentiated by usage type.

Such indications received from the monitoring components may also include indications of the types of nodes that make up each of the HA groups of a storage cluster system. In some storage cluster systems, all of the nodes may be configured identically with identical sets of components coupled in an identical manner and configured with identical parameter settings such that there may be only one node type present in each of such storage cluster systems. However, in other storage cluster systems, there may be differences among the nodes including differing sets of components, differences in the manner in which those components are coupled and/or differences in parameter settings such that there are multiple node types present in each of such storage cluster systems. Still, even in storage cluster systems that employ more than one node type, there is a tendency to arrange for each HA group to include only one node type so that only nodes of the same node type may take over for each other. Different node types may provide different levels of different resources and/or may be capable of supporting each different type of IOP with a different level of throughput and/or a different latency such that subjecting different node types to the same level of use of a particular usage type may beget different levels of performance. Thus, the collection server may also store the indications received from the monitoring components in a manner in which they are differentiated by node type, as well as by usage type.

A modeling server of the administration system may recurringly access the account database maintained by the collection server to recurringly obtain information from which to generate and/or augment models of nodes. Just as the collection server may differentiate between usage types and node types in storing the indications received from the monitoring components, the modeling server may generate separate node models for each different combination of node type and usage type associated with each storage cluster system. Therefore, each node model may describe a mathematic relationship between levels of usage and the levels of performance that result for a particular node type subjected to a particular usage type. For example, each node model may describe, for a particular combination of node type and usage type, a mathematic relationship between levels of IOPs per second and such measures of resulting levels of performance as levels of utilization of one or more resources, levels of data throughput and/or levels of latency of data propagation. In some embodiments, the modeling server may maintain at least a subset of the node models it generates in a model database for possible subsequent reuse and/or refinement. However, in other embodiments, the modeling server may newly regenerate each node model as needed, and may not maintain any node model in any form of model database.

Although the node type of each node of a storage cluster system may change only when changes are made by administrative personnel to that storage cluster system (e.g., upgrades made by administrative personnel), it is envisioned that the usage types to which each node of a storage cluster system may be subjected may change frequently. It is also envisioned that, while nodes belonging to the same HA group may often perform substantially similar combinations of different types of IOPs (and therefore, be subjected to the same usage types) at substantially the same time as a result of mirroring the IOPs associated with storage service requests between those nodes, there may be instances in which the nodes of a HA group may be subjected to performing different usage types. This may occur as a result of differing maintenance operations performed by different ones of the nodes of a HA group at different times, or as a result of one of the nodes of a HA group replicating commands to the other in support of the aforementioned mirroring. Accordingly, the collection server may retrieve and store the indications provided by the monitoring components of the nodes of a HA group on a relatively short recurring interval of time that may be selected to be frequent enough to capture such frequent changes in usage types and/or instances in which nodes of the same HA group change between performing similar and different usage types. By way of example, in some embodiments, the selected interval of time may be 5 minutes.

Correspondingly, the modeling server may retrieve from the account database such stored indications also on a relatively short recurring interval of time that is also selected to be frequent enough to keep the node models generated and/or stored by the modeling server relatively current. In some embodiments, this interval of time associated with the modeling server may the selected to be the same interval of time associated with the collection server. Since each node can be subjected to performing only one combination of IOPs that define one usage type at any given time, and since the modeling server may generate and/or maintain a different node model for each combination of node type and usage type associated with a storage cluster system, only a subset of the node models associated with a storage cluster system would be generated or updated during each of the relatively frequently occurring intervals of time. Stated differently, only the node models associated with the combinations of node type and usage type that are associated with the indications of usage levels and levels of performance most recently received from the monitoring components of the nodes of a storage cluster system are generated or updated. Also, where the indications received from the monitoring components of nodes of a particular storage cluster system are associated with a combination of node type and usage type for which a node model does not already exist, the modeling server may generate or regenerate that model.

The modeling server may recurringly provide indications of which node models have been most recently updated and/or generated during the most recent interval of time to an analysis server. The analysis server may recurringly retrieve the most recently updated and/or generated node models associated with nodes of a storage cluster system and may employ those recurringly retrieved node models to recurringly check whether the nodes of at least one HA group of that storage cluster system are able to take over for each other in the event of a failure occurring within one of those nodes. In so doing, the analysis server may separate the portion of the usage of each of the nodes of a HA group that arises from the performance of internal processes within each node to maintain their operational status from the portion of usage of each of those nodes that arises from performing IOPs associated with storage service requests received by the storage cluster system from one or more client devices. Then, for each pair of nodes where one may take over for the other, the analysis server may combine the levels of usage from each of those two nodes that arises from performing IOPs associated with storage service requests with the level of usage from just one of those two nodes that arises from performing internal processes to derive the total level of usage that one of those two nodes would be subjected to if it took over for the other of those two nodes. The analysis server may then apply that total level of usage to one of the node models associated with one of those two nodes or may apply that total level of usage to a combination of the node models associated with each of those two nodes (e.g., a converged model arrived at through a weighted average). The analysis server may then check whether applying that total level of usage to the selected model or to the combination of two models reveals that the total level of usage would result in one or more levels of performance that violates a predetermined threshold. By way of example, the analysis server may check whether a predetermined maximum level of latency of data throughput would be exceeded. If there is a violation of such a predetermined threshold, then the analysis server may determine that neither of those two nodes is currently able to take over for the other given the current levels of use of each of those two nodes under the usage type(s) to which each of those two nodes are currently subjected. However, if there is no violation of such a predetermined threshold, then the analysis server may determine that each of those two nodes is currently able to take over for the other.

Each time the analysis server performs such a check, the analysis server may store an indication of the resulting determination in a record of the results of such checks maintained over a relatively long term. The analysis server may maintain such a long term record for each HA group and/or each storage cluster system. The analysis server may recurringly analyze at least a portion of such a long term record for each pair of nodes where one is to take over for the other in a storage cluster system. For each such pair of nodes, the analysis server may determine whether determinations that neither node is able to take over for the other occur with a frequency great enough to exceed a predetermined maximum threshold of frequency of such occurrences. Alternatively or additionally, the analysis server may determine whether the frequency of such determinations is increasing such that there is a trend toward eventually exceeding such a predetermined maximum threshold at a later date. If the analysis server determines that such a threshold has been exceeded or will eventually be exceeded, then the analysis server may transmit an indication thereof to one or more administration devices as an alert. Further, the analysis server may cooperate with one or more administration devices to provide details of conditions associated with the instances at which neither node of a pair nodes is determined to be able to take over for the other. In so doing, the analysis server may provide one or more graphs indicative of the node model(s) and/or the conditions serving as the basis for each determination.

Each node model may be generated by the modeling server using any of a variety of techniques from one or more of the indications received from the monitoring components of one or more nodes of that particular node type. In providing a representation of a mathematic relationship between usage levels and levels of performance associated with a particular combination of node type and usage type, each node model may provide an indication of a usage level for a particular combination of node type and usage type beyond which there are diminishing returns. More precisely, the mathematic relationship may specify that as a node of a particular node type is used to an increasing degree to perform the combination of IOPs of a particular usage type, the level of utilization of a resource provided by that node and the latency of data propagation through that node may both increase. Starting at either a zero level of usage or a relatively low level of usage of the node, the rates at which the level of resource utilization and latency both increase may initially change relatively gradually as the usage level increases. However, at a point of diminishing returns that is relatively close to full utilization of the resource, the rates at which the level of resource utilization and latency both increase as the level of usage of the node continues to increase may change relatively greatly such that even a relatively small further increase in the usage level results in a relatively large increase in latency as still more of the last relatively small available amount of the resource is utilized. In other words, each model may provide a representation of a non-linear relationship among a level of usage of a node, a level of utilization of a resource provided by that node and a latency of data throughput through that node that includes a point of diminishing returns. With there being such a point of diminishing returns beyond which a sharp further increase in latency results from even a small further increase in usage of the node, a predetermined threshold for a maximum acceptable latency for data propagation may be quickly reached.

Each of the storage cluster systems from which the collection server receives indications provided by the monitoring components thereof may incorporate multiple nodes and/or storage devices arranged to create HA groups in which nodes may take over for each and/or fault-tolerant arrays on which client data may be stored in a fault-tolerant manner that prevents loss of client data in the event of a malfunction. Further, the multiple nodes and multiple storage devices may be divided into multiple clusters that may be installed at geographically distant locations, but that may be interconnected in a manner in which the state of the client data stored within the storage devices of one cluster may be mirrored in the state of the client data stored within the storage devices of another cluster.

In various embodiments, the operator of the administration system may be a purveyor of the storage cluster systems from which the collection server receives such information, such as a manufacturer, distributor, reseller, installer and/or repairer of those storage cluster systems. Thus, each of the operators of one or more of those storage cluster systems may be a customer of such a purveyor, and so each of the operators of one or more of those storage cluster systems may be deemed an account of the operator of the administration system. Each of those storage cluster system operators may be a corporate, governmental, non-profit or other entity that employs one or more of such storage cluster systems for use in storing their own data. Alternatively or additionally, each of those storage cluster system operators may be a corporate, governmental, non-profit or other entity that operates one or more of such storage cluster systems to provide storage services and/or other services that include storage services to a multitude of end users of those services. As part of operating one or more of such storage cluster systems, each of those storage cluster system operators may employ or otherwise engage the services of one or more administrators to oversee the operation thereof. Those administrators may be responsible for allocating available storage resources, maintenance, security, performing upgrade and/or diagnosing failures. Also, the operator of the administration system may similarly employ or otherwise engage the services of one or more assisting administrators to assist the administrators associated with the storage cluster system operators. Indeed, each of such assisting administrators may be assigned a particular subset of the storage cluster system operators to which they are to provide such assistance.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an example embodiment of an administration system 2000 interacting with one or more storage cluster systems 1000 via a network 999. As depicted, the administration system 2000 may incorporate one or more administration devices 2200, a collection server 2400, a modeling server 2500 and/or an analysis server 2600. As also depicted, each of the one or more storage cluster systems 1000 may incorporate one or more client devices 100, one or more administration devices 200, multiple nodes 300 and/or multiple storage devices 800. As further depicted, and as will be discussed in greater detail, one or more of the devices of each of the storage cluster systems 1000 may exchange data with one or more of the devices of the administration system 2000 via the network 999. The network 999 may be a single network limited to extending within a single building or other relatively limited area, may include a combination of connected networks extending a considerable distance, and/or may include the Internet.

Within each of the one or more storage cluster systems 1000, the multiple nodes 300 and the multiple storage devices 800 may be organized into one or more clusters 1300. Within each of the one or more clusters 1300, the multiple nodes 300 and the multiple storage devices 800 therein may be further organized into one or more HA groups 1600. Each of the nodes 300 may control one or more of the storage devices 800 to store client data received from the one or more client devices 100. As has been discussed, each of the one or more HA groups 1600 includes at least two nodes 300 that are configured and interconnected to enable one node 300 to take over for another node 300 in response to a failure within that other node 300. The node 300 that takes over for another node 300 takes over control of the one or more storage devices 800 that were under the control of that other node 300. As a result, the node 300 that takes over for the other node 300 must also take over the performance of the input/output operations (IOPs) that were performed by that other node 300. To do so, the node 300 that takes over for the other node 300 must have the ability to perform those IOPs taken over from that other node 300. The one or more administration devices 200 may be operated by one or more administrators to configure aspects of the operation of the multiple nodes 300 and/or to configure aspects of the manner in which the client data is stored among the multiple storage devices 800. On a recurring basis, a monitoring component of at least one of the nodes 300 of each of the one or more storage cluster systems 1000 may transmit various pieces of information concerning the configuration and operation of the multiple nodes 300 of that one of the storage cluster systems 1000 to the collection server 2400 of the administration system 2000.

Within the administration system 2000, the collection server 2400 may store and organize the information received via the network 999 from the monitoring component of the at least one node 300 of each of the storage cluster systems 1000 in an account database that associates particular storage cluster systems 1000 with particular accounts. The information received by the collection server 2400 from the at least one node 300 of each of the storage cluster systems 1000 may be stored within an account entry 2433 associated with an operator of one or more of the storage cluster systems 1000. For each such operator, a separate account entry 2433 may be defined within an account database 2430 maintained by the collection server 2400, and each account entry 2433 may include the information received from all of the storage cluster systems 1000 operated by a single such operator.

The modeling server 2500 may recurringly access the account entries 2433 of the account database 2430 to recurringly generate and/or update node models. Each such model corresponds to a different combination of node type of at least one node 300 within a storage cluster system 1000 and a usage type. Especially, where data is retrieved from the collection server 2400 that is found to be for a combination of node type and usage type for which no node model has yet been generated, the modeling server 2500 may use such retrieved data to generate such a new node model. In some embodiments, the modeling server 2500 may retain only node models that are currently needed for analysis to determine the ability of one node to take over for another, as will be described in greater detail. In such embodiments, the modeling server 2500 may discard node models that are no longer currently needed. However, in other embodiments, the modeling server 2500 may at least selectively retain previously generated node models for each of a wide range of combinations of node types and usage types in separate model entries 2533 of a model database 2530 for a longer period of time. Such longer term retention of previously generated models may be deemed desirable to enable the refinement of node models over time as more data is received.

The analysis server 2600 may recurringly access the account entries 2433 of the account database 2430 to obtain indications of recent usage levels at which the nodes 300 of one or more storage cluster systems 1000 may have been used. The analysis server 2600 may also recurringly retrieve the most recently generated and/or updated models that correspond to the combinations of node types and usage types applicable to those same nodes 300 at those retrieved usage levels. The analysis server 2600 may then employ the retrieved usage levels and node models to determine whether corresponding ones of the nodes 300 within each of the one or more HA groups 1600 within each of the one or more storage cluster systems 1000 are currently able to support taking over for one another in view of their current usage levels under their current usage types. The analysis server 2600 may store the results of such recurring determinations in results entries 2633 of a results database 2600 over a relatively long period of time.

The analysis server 2600 may then recurringly analyze the stored histories of determinations of whether the nodes within each of the one or more HA groups 1600 within each of the one or more storage cluster systems 1000 are able to take over for each other. If the analysis server 2600 determines that the frequency with which determinations have been made over a predetermined period of time that the nodes 300 of a particular HA group 1600 were not able to take over for each other exceeds a maximum frequency threshold, then the analysis server 2600 may transmit an indication of that threshold having been exceeded to one or more of the administration devices 200 and/or 2200. Alternatively or additionally, if the analysis server 2600 determines that the frequency with which determinations have been made over a predetermined period of time that the nodes 300 of a particular HA group 1600 were not able to take over for each other is increasing such that there is a rising trend of such determinations towards exceeding the maximum frequency threshold, then the analysis server 2600 may transmit an indication of that rising trend to one or more of the administration devices 200 and/or 2200.

In some embodiments, the operator of the administration system 2000 may be the operator of one or more of the storage cluster systems 1000 from which the collection server 2400 receives such information. Such a storage cluster system operator may be a corporate, governmental, non-profit or other entity that employs one or more of such storage cluster systems 1000 for use in storing their own data. Alternatively or additionally, such a storage cluster system operator may operate their one or more of such storage cluster systems to provide storage services and/or other services that require storage to a multitude of end users of those services. As part of operating one or more of such storage cluster systems, each of those storage cluster system operators may employ or otherwise engage the services of one or more administrators to oversee the operation thereof through operation of the one or more administration devices 200 and/or 2200. In such embodiments, the administration system 2000 may be co-located with at least one of the one or more storage cluster systems 1000 operated by the operator and overseen by those administrators.

However, in other embodiments, the operator of the administration system 2000 may be a purveyor of the storage cluster systems 1000 from which the collection server 2400 receives such information, such as a manufacturer, distributor, reseller, installer and/or repairer of those storage cluster systems. Thus, each of the operators of one or more of those storage cluster systems 1000 may be a customer of such a purveyor, and each may be a corporate, governmental, non-profit or other entity that employs one or more of such storage cluster systems for use in storing their own data. Alternatively or additionally, one or more of those storage cluster system operators may operate one or more of such storage cluster systems to provide storage services and/or other services that require storage to a multitude of end users of those services. As part of operating one or more of such storage cluster systems, each of those storage cluster system operators may employ or otherwise engage the services of one or more administrators to oversee the operation thereof through operation of the one or more administration devices 200 of each of the storage cluster systems 1000. Also, the operator of the administration system 2000 may similarly employ or otherwise engage the services of one or more assisting administrators to assist the administrators associated with the storage cluster system operators through operation of the one or more administration devices 2200.

Figure 2A:
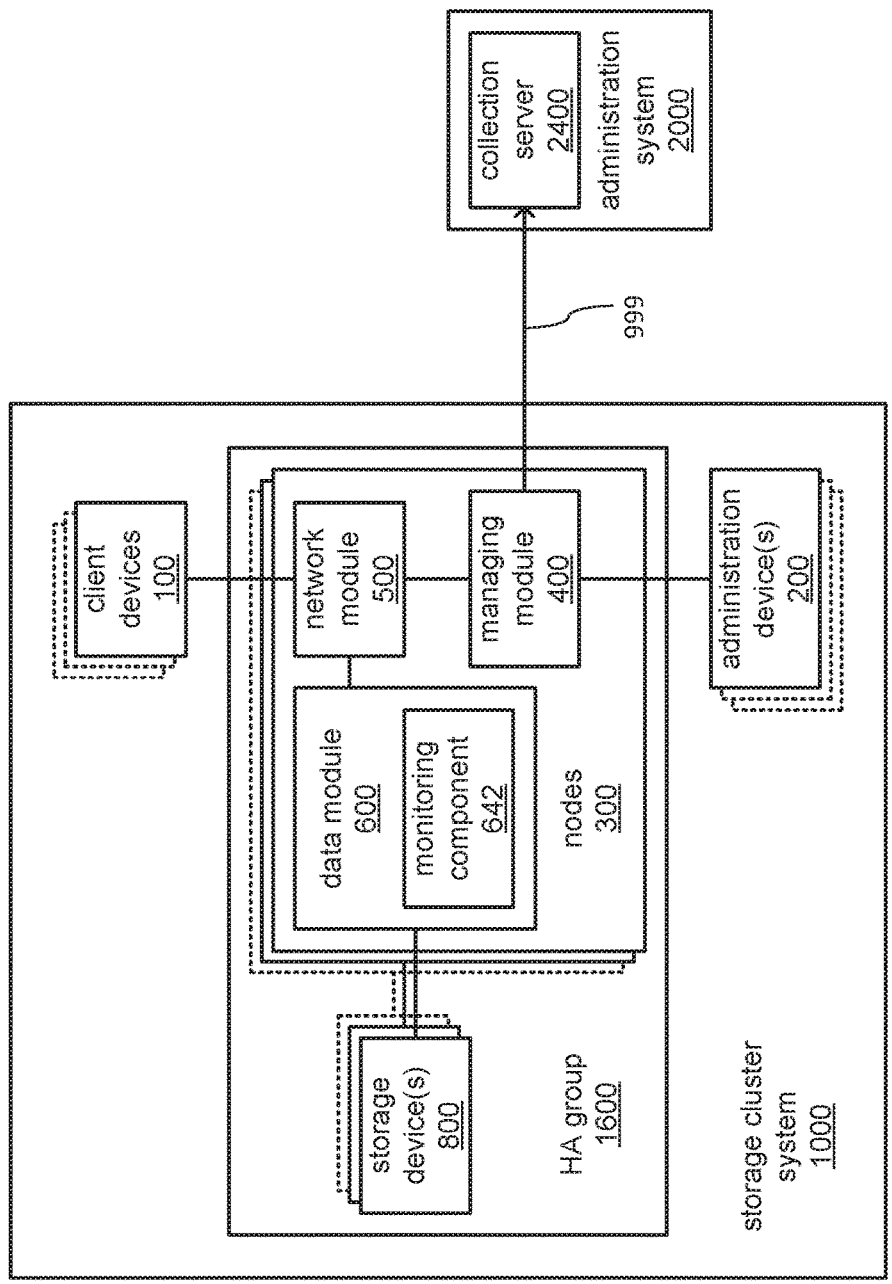
FIGS. 2A-B, together, illustrate an example embodiment of a collection server of an administration system.
Figure 2B:
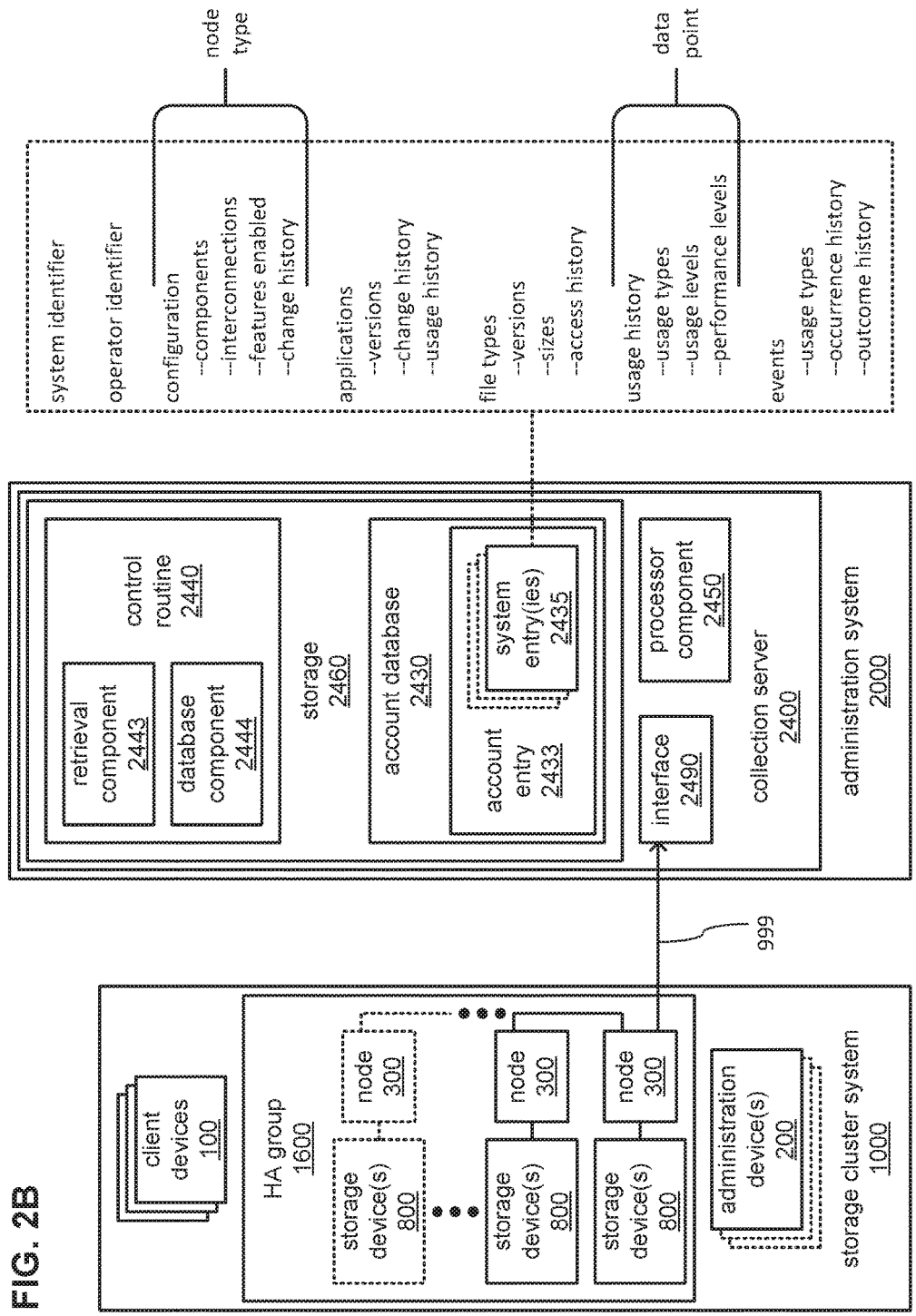
Figure 3A:
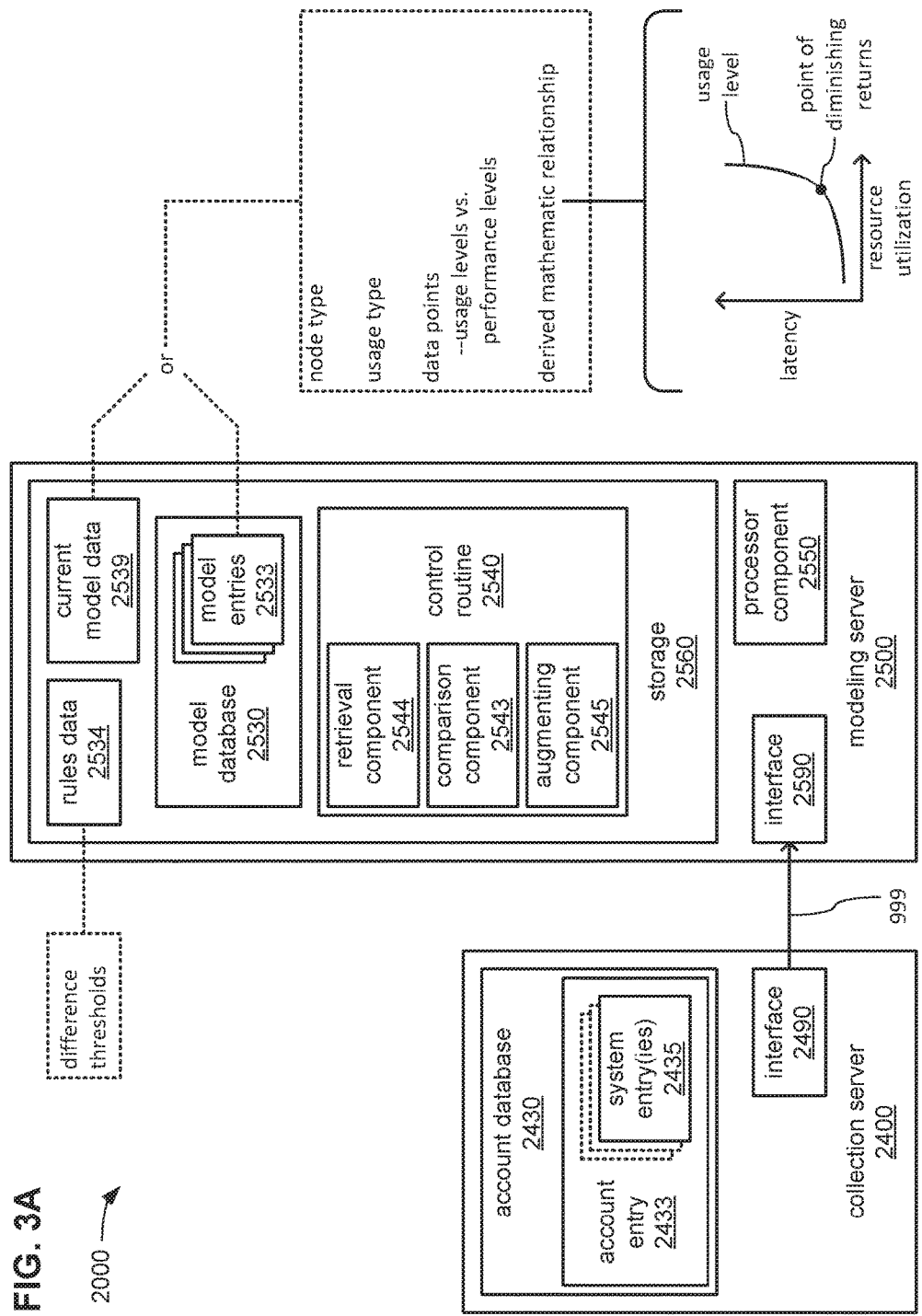
FIGS. 3A-B, together, illustrate an example embodiment of a modeling server of an administration system.
Figure 3B:
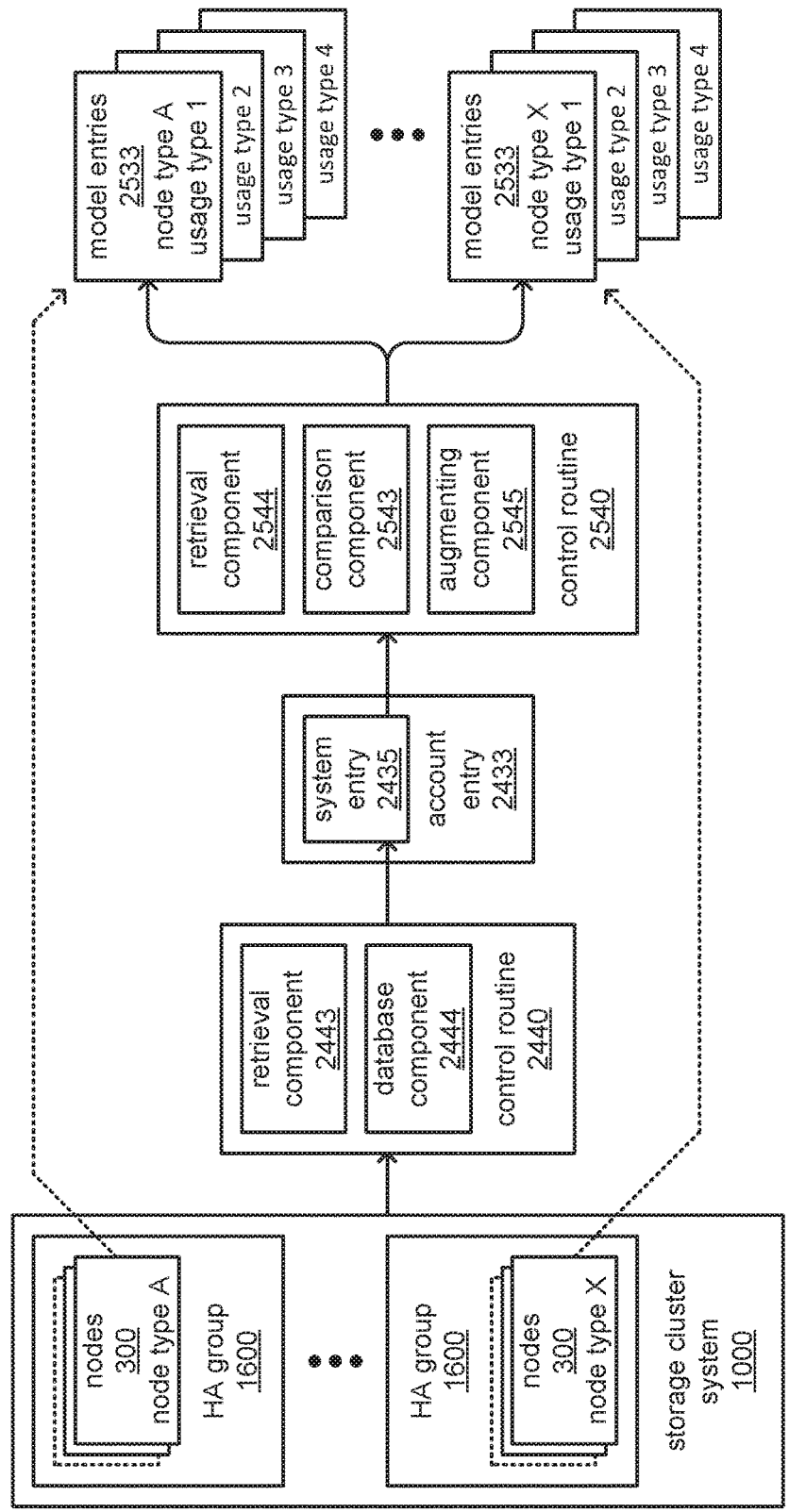

FIGS. 2A-B, 3A-B, 4A-B and 5 each illustrate a block diagram of a portion of an embodiment of the administration system 2000 of FIG. 1 in greater detail. More specifically, FIGS. 2A-B, together, depict aspects of the operating environment of an example embodiment of the collection server 2400; FIGS. 3A-B, together, depict aspects of the operating environment of an example embodiment of the modeling server 2500; and FIGS. 4A-B and 5, together, depict aspects of the operating environment of an example embodiment of the analysis server 2600.

Turning to FIG. 2A, as has been discussed, each of the one or more storage cluster systems 1000 may incorporate one or more HA groups 1600, and each such HA group 1600 may incorporate at least two nodes 300 that each control one or more storage devices 800 and that are configured (e.g., with parameter settings and/or interconnections made therebetween) such that one of those nodes 300 may take over for another of those nodes 300 in response to a malfunction in the other of those nodes 300. It should be noted that although only one HA group 1600 is depicted, one or more storage cluster systems 1000 may incorporate more than one HA groups 1600, and further, one or more storage cluster systems 1000 may organize multiple HA groups 1600 into clusters 1300 that may be geographically dispersed to provide still greater fault tolerance.

As depicted, in various embodiments, each of the nodes 300 of may incorporate a data module 600 to serve as a controller of the storage devices 800 to which that node is coupled, a network module 500 to interact with one or more client devices 100 to receive and respond to storage requests received therefrom, and a managing module 400 by which the at least one node 300 may be directly configured and other node(s) 300 may be indirectly configured. As also depicted, the data module 600 may incorporate a monitoring component 642 to monitor various aspects of the operation of the node 300, including and not limited to, usage levels of the node 300, usage types to which the node 300 is subjected, resulting utilization of resources provided by the data module 600 and/or other portions of the node 300, resulting levels of data throughput through the node 300, and resulting latencies of data propagation through the node 300. It should be noted that although much of such monitoring may be performed by the monitoring component 642 from within the data module 600, it may be the managing module 400 that performs the transmission of information from such monitoring, as well as other information concerning configuration and aspects of operation, to the collection server 2400.

Turning to FIG. 2B, in various embodiments, the collection server 2400 may incorporate one or more of a processor component 2450, a storage 2460 and an interface 2490 to couple the collection server 2400 to at least the network 999. The storage 2460 may store the account database 2430 and a control routine 2440. The account database 2430 may be made up of numerous ones of the account entries 2433, and each of the account entries 2433 may include one or more system entries 2435. The control routine 2440 may incorporate a sequence of instructions operative on the processor component 2450 in its role as a main processor component of the collection server 2400 to implement logic to perform various functions during execution of the control routine 2440 by the processor component 2450.

As depicted, the control routine 2440 may incorporate a retrieval component 2443 executable by the processor component 2450 to operate the interface 2490 to receive information concerning the configuration and operating aspects of the nodes 300 of the one or more storage cluster systems 1000.

The retrieval component 2443 may operate the interface 2490 to recurringly contact at least one node 300 of one or more of the storage cluster systems 1000 via the network 999 to poll for such information on what may be regular intervals. Alternatively or additionally, the retrieval component 2443 may operate the interface 2490 to await transmission of such information to the collection server 2400 by at least one node 300 of each of the storage cluster systems 1000. Again, at least one node 300 of each of the one or more of the storage cluster systems 1000 may transmit such information to the collection server 2400 at a recurring interval of time and/or in response to the occurrence of one or more particular events (e.g., a trouble event) as part of providing the collection server 2400 with a record thereof for subsequent diagnostics.

The information so collected from one of the storage cluster systems 1000 may include identifiers of that storage cluster system 1000, identifiers or contact information for the operator of that storage cluster system 1000, and/or identities or contact information for one or more administrators associated with the operator (e.g., a network address of one of the administration devices 200 that is associated with one or more of those administrators). Such information may include indications of various aspects of the hardware and/or software components that make up that storage cluster system 1000, including the components that make up each of the nodes 300, such as versions of those components and/or dates of manufacture of those components. Such information may include indications of the manner in which various aspects of that storage cluster system 1000 are configured, including how each of the nodes 300 are configured, such as the manner in which various hardware components thereof are coupled, what features have been configured to be enabled or disabled, and/or the manner in which client data and/or other data are organized as stored within one or more of the storage devices 800. Such information may include indications of what applications software is used with that storage cluster system 1000, including versions of those applications, histories of changes in what applications are used, and/or histories of the pattern and/or degree of usage of each of those applications. Such information may include indications of the kind of client data stored within one or more of the storage devices 800 of that storage cluster system 1000, including types of data files, versions of the file types that are used, the sizes of various types of data files, and/or the pattern and/or frequency of accesses made to various types of data files. Such information may include indications of occurrences of various events within or otherwise involving that storage cluster system 1000, including types of events (e.g., malfunctions of nodes 300, instances of one node 300 taking over for another node 300, instances of exceeding storage capacity, resizing of volumes, additions and/or removals of storage devices 800, etc.), the outcomes of various events, and/or the pattern and/or frequency of occurrence of various types of events.

More specifically, such information may include indications of different usage types to which that storage cluster system 1000 and/or one or more of its nodes 300 may be subjected, where each usage type is defined by different combination of input/output operations (IOPs) performed by that storage cluster system 1000 and/or by each of the nodes 300 of that storage cluster system 1000. Also more specifically, such information may include measures of performance resulting from each usage level of each type to which a storage cluster system 1000 and/or its nodes 300 may be subjected, where the resulting performance measures may be defined in terms of resulting consumption of various resources, resulting data throughput, and/or resulting latencies of data propagation.

As additionally depicted, such information received from the monitoring component 642 of at least one node 300 of each of the storage cluster systems 1000 may serve as configuration information, including selection of components making up each node 300, interconnections among those components, which features are enabled and/or disabled, etc. may serve to define the node type of each of the nodes 300 of one of the storage cluster systems 1000. As also additionally depicted, such information as usage type, level of usage under a particular usage type, and the resulting performance levels (e.g., level of utilization of a resource, level of data throughput and/or latency of data propagation) may serve, along with an indication of node type, to define a data point. Again, while it is envisioned that node types of nodes 300 are unlikely to change frequently such that indications of changes in node types are envisioned as being received infrequently, it is envisioned that changes in usage types and levels of usage to which each node 300 is subjected will change frequently.

As further depicted, the control routine 2440 may incorporate a database component 2444 executable by the processor component 2450 to organize and store such information as is received from at least one node 300 of each of the storage cluster systems 1000 in the account database 2430. As previously discussed, the account database 2430 may be divided into multiple account entries 2433 with each of the account entries 2433 storing all of such information received from one or more storage cluster systems 1000 that are operated by a single storage cluster system operator. As also previously discussed, where a single storage cluster system operator operates multiple ones of the storage cluster systems 1000, the information received from each of those storage cluster systems 1000 may be stored in separate system entries 2435 defined within the account entry 2433 associated with that storage cluster system operator.

Turning to FIG. 3A, in various embodiments, the modeling server 2500 incorporates one or more of a processor component 2550, a storage 2560 and an interface 2590 to couple the modeling server 2500 to at least the network 999. The storage 2560 may store rules data 2534 and a control routine 2540. Also, in some embodiments, the storage 2560 may store the model database 2530 to retrain a wide variety of node models covering different combinations of node type and usage type for a relatively long period of time. If present, the model database 2530 may be made up of numerous ones of the model entries 2533 that each store a node model. However, in other embodiments, the storage 2560 may store a current model data 2539 to retain a more limited variety of node models limited to current combinations of node type and usage type. The control routine 2540 may incorporate a sequence of instructions operative on the processor component 2550 in its role as a main processor component of the modeling server 2500 to implement logic to perform various functions during execution of the control routine 2540 by the processor component 2550.

As previously discussed, different storage cluster systems 1000 may differ in their configuration, such as what components (hardware and/or software, network controllers, storage device controllers, storage devices, etc.) make up the nodes of each of the storage cluster systems 1000, how those components are interconnected, the applications for which each storage cluster system 1000 is used, the quantity and/or type of client data stored by each storage cluster system, etc. As a result of so many variables in the configuration of each storage cluster system 1000, it may be deemed unrealistic to generate and maintain a single model of performance characteristics for all possible configurations. Thus, and as depicted in FIG. 3A, there may be at least one separate model stored in a separate model entry 2533 for each node type defined by the such aspects of the configuration of a storage cluster system 1000 and each of its nodes. Each such model entry 2533 may store indications of various aspects of the particular configuration associated with that particular node type, such as what components are included, how those components are interconnected, what features of those components are configured to be enabled, version levels etc. The node model stored therein may derived from multiple data points in which a level of usage of the particular node type is correlated to one or more performance level measures that are observed to result, including one or more of a resulting level of utilization of a resource, a resulting level of latency in data propagation, a resulting level of data throughput, etc. As more data points associated with the particular node type are provided from the account database 2430, a more complete model of the performance characteristics of the particular node type (including the correlations thereamong) may be derived and maintained.

However, as also previously discussed, each node 300 of a storage cluster system 1000 may be subjected to performing, at different times, any of a variety of widely differing combinations of input/output operations (IOPs) that each define a different usage type. Again, each usage type may be made up of a different combination of such operations reading data, storing data, copying data, moving data, etc. Thus, each usage type may place widely differing demands for different resources provided by a node 300 such that a relatively limited usage level of a node 300 under one usage type may in no way reach or exceed an upper limit of utilization of a particular available resource, while a similar relatively limited usage level of the same node 300 under another usage type may very readily reach or exceed that upper limit. As a result, it may be deemed unrealistic to generate and maintain a single node model of performance characteristics for even a single node type that covers all of the usage types to which nodes 300 of that single node type may be subjected. Thus, as previously discussed, different node models may be generated, at least as needed, for each of multiple combinations of node type and usage type.

In embodiments in which the modeling server 2500 maintains the model database 2530 to retain such a wide variety of node models, multiple model entries 2533 may be generated for each node type, where each of those model entries 2533 stores a different node model that is associated with a different combination of node type and usage type. Therefore, as depicted in FIG. 3A, each model entry 2533 may additionally include an indication of the particular usage type associated with the node model stored therein, in addition to including an indication of the node type with which the node model stored therein is associated. FIG. 3B depicts the considerable proliferation of node models (each of which may be stored within a separate one of the model entries 2533) that may result, even for just one storage cluster system 1000 that may have only two HA groups 1600 that each employ a different node type, where the nodes 300 may be subjected to any of a range of usage types 1 through 4. As depicted, a separate model entry 2533 may be generated to store a separate node model associated with each possible combination of one of the node types and one of the usage types.

Returning to FIG. 3A, also depicted is a graphical depiction of an example mathematic relationship that may be derived from data points associated with a particular combination of node type and usage type, and which may be represented by the node model associated therewith. As more data points associated with a particular combination of node type and usage type are provided from the account database 2430 that each correlate a level of usage to one or more levels of performance, an ever more complete model of the performance characteristics of that particular combination of node type and usage type is able to be derived. More specifically, with a sufficiently complete model, correlations may be derived between usage level of the particular node type with the particular usage type, and one or more of resource utilization, latency of data propagation and/or data throughput.

As depicted, the control routine 2540 may incorporate a retrieval component 2544 executable by the processor component 2550 to operate the interface 2590 to recurringly access the account entries 2433 and/or system entries 2435 of the account database 2430 maintained by the collection server 2400. The retrieval component 2544 may operate the interface 2590 to recurringly contact the collection server 2400 via the network 999 to poll for the contents of each of the account entries 2433 and/or system entries 2435 on what may be a regular interval. Alternatively or additionally, the retrieval component 2544 may operate the interface 2590 to await transmission of the contents of each of the account entries 2433 and/or system entries 2435 by the collection server 2400, which may transmit such contents to the modeling server 2500 at a recurring interval of time and/or in response to the occurrence of one or more particular changes to the contents of one of the account entries 2433 and/or system entries 2435. Again, among the contents of each of the account entries 2433 and/or system entries 2435 may be the aforedescribed data points along with indications of changes in configurations of nodes 300 and/or events that have occurred during the operation of a storage cluster system 1000.

In embodiments in which the modeling server 2500 maintains the model database 2530 to store node models, the control routine 2540 may also incorporate a comparison component 2543. The comparison component may be executable by the processor component 2550 to determine whether a newly received data point is associated with a combination of node type and usage type that necessitates the generation of a new node model and a new model entry 2533 in which to store the new node model, or if an existing node model stored within an existing model entry 2533 is to be augmented with the information conveyed by the newly received data point. More precisely, where the new data point is associated with a new combination of node type and usage type, the comparison component 2543 may compare that combination with the combinations of node type and usage type associated with each of the model entries 2533 already included in the model database 2530. If there is a match between the combination of node type and usage type of the newly received data point and the combination of node type and usage type associated with a model entry 2533 that is close enough to a degree meeting a minimum matching threshold specified in the rules data 2534, then the node model stored within that model entry 2533 may be augmented with that newly received data point. However, if there is no such match to a combination of node type and usage type associated with any of the model entries 2533, then a new model entry 2533 may be generated that is associated with the combination of node type and usage type of the newly received data point, and a new node model based at least on that data point may be generated and stored within that new model entry 2533.

Also in embodiments in which the modeling server 2500 maintains the model database 2530 to store node models, the control routine 2540 may incorporate an augmenting component 2545 executable by the processor component 2550 to augment aspects of the model database 2530 as triggered by the comparison component 2543, and based on one or more of the parameters specified by the rules data 2534. Where there is a newly received data point, and the comparison component 2543 has determined that there is a model entry 2533 that represents a match to a degree sufficient to meet a minimum matching threshold specified in the rules data 2534 (as described above), then the comparison component 2543 may trigger the augmenting component 2545 to augment the node model already stored in that model entry 2533 with the newly received data point. However, where the comparison component 2543 determines that there is no such match for a newly received data point, then the comparison component 2543 may trigger the augmenting component 2545 to augment the model database 2530 with a new model entry 2533 and to generate the new node model that is to be stored within that new model entry 2533 based at least on that new data point.

In contrast, in embodiments in which the modeling server 2500 does not maintain the model database 2530, a new node models for each node in a HA group may be generated and all previously generated node models may be discarded each time new data points are received from the collection server 2400. As a result, instead of multiple node models being retained for a longer term for combination of node type and usage type, only node models for the combinations of node type and usage type associated with the most recently received data points are retained, and only until the next data points are received. Thus, the amount of node model information retained at any given time may be considerably less, and may be stored as the current node data 2539, which may be a considerably smaller data structure with considerably simpler organization than the model database 2530.

In such embodiments, the comparison component 2543 may compare the combinations of node type and usage type associated with each of the data points to each other to identify the ones that have similar enough combinations of node type and usage type that they should be used together in generating the same node model. The augmenting component 2545 may then be triggered by the comparison component to so use the usage level(s) indicated in the one or more data points on which the generation of each node model is to be based to so generate each of the node models. Any previously generated node models stored within the current model data 2539 is then discarded and replaced with the node models newly generated by the augmenting component 2545.

Figure 4A:
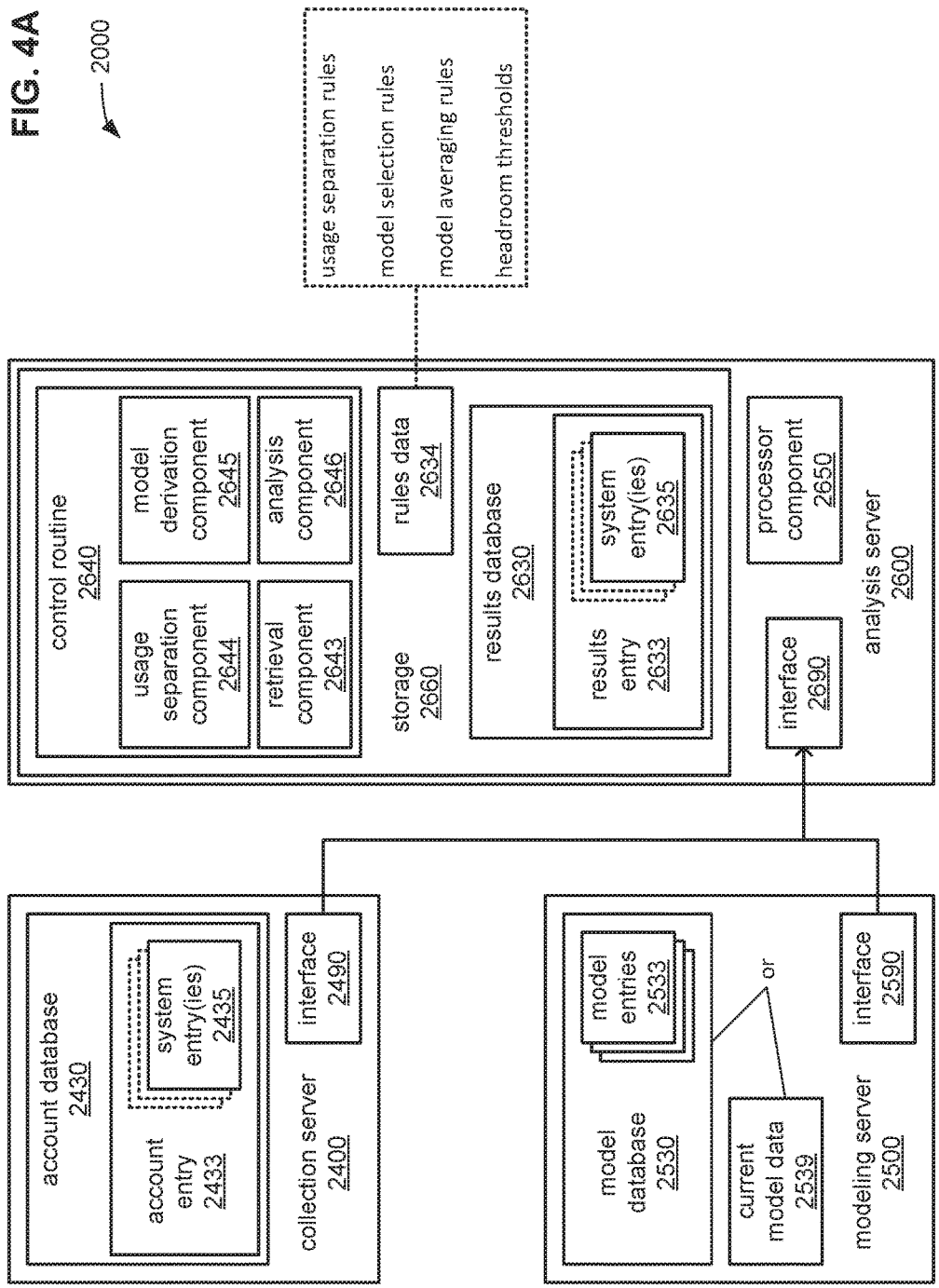
FIGS. 4A-B and 5, together, illustrate an example embodiment of an analysis server of an administration system.

Turning to FIG. 4A, in various embodiments, the analysis server 2600 incorporates one or more of a processor component 2650, a storage 2660 and an interface 2690 to couple the analysis server 2600 to at least the network 999. The storage 2660 may store the results database 2630, rules data 2634 and a control routine 2640. The results database 2630 may be made up of numerous ones of the results entries 2635. The control routine 2640 may incorporate a sequence of instructions operative on the processor component 2650 in its role as a main processor component of the analysis server 2600 to implement logic to perform various functions during execution of the control routine 2640 by the processor component 2650.

As depicted, the control routine 2640 may incorporate a retrieval component 2643 executable by the processor component 2650 to operate the interface 2690 to recurringly access the account entries 2433 and/or system entries 2435 of the account database 2430 maintained by the collection server 2400. The retrieval component 2643 may operate the interface 2690 to recurringly contact the collection server 2400 via the network 999 to poll for the contents of each of the account entries 2433 and/or system entries 2435 on what may be a regular interval. Alternatively or additionally, the retrieval component 2643 may operate the interface 2690 to await transmission of the contents of each of the account entries 2433 and/or system entries 2435 by the collection server 2400, which may transmit such contents to the analysis server 2600 at a recurring interval of time and/or in response to the occurrence of one or more particular changes to the contents of one of the account entries 2433 and/or system entries 2435. Among the contents of each of the account entries 2433 and/or system entries 2435 may be data points for particular combinations of node types and usage types that each correlate a level of usage of a node 300 of a particular node type under a particular usage type with observed resulting levels of performance.

As also depicted, the retrieval component 2643 may also operate the interface 2690 to recurringly access either the current model data 2539 maintained by some embodiments of the modeling server 2500, or the model entries 2533 of the model database 2530 maintained by other embodiments of the modeling server 2500, as has previously been discussed. The retrieval component 2643 may operate the interface 2690 to recurringly contact the modeling server 2500 via the network 999 to poll for the contents of each of the model entries 2533 or for the contents of the current model data 2539 on what may be a regular interval. The retrieval component 2643 may operate the interface 2690 to await transmission of recently generated and/or updated node models by the modeling server 2500, which may transmit such contents to the analysis server 2600 at a recurring interval of time and/or in response to the occurrence of one or more particular changes to at least one of the node models.

Figure 4B:
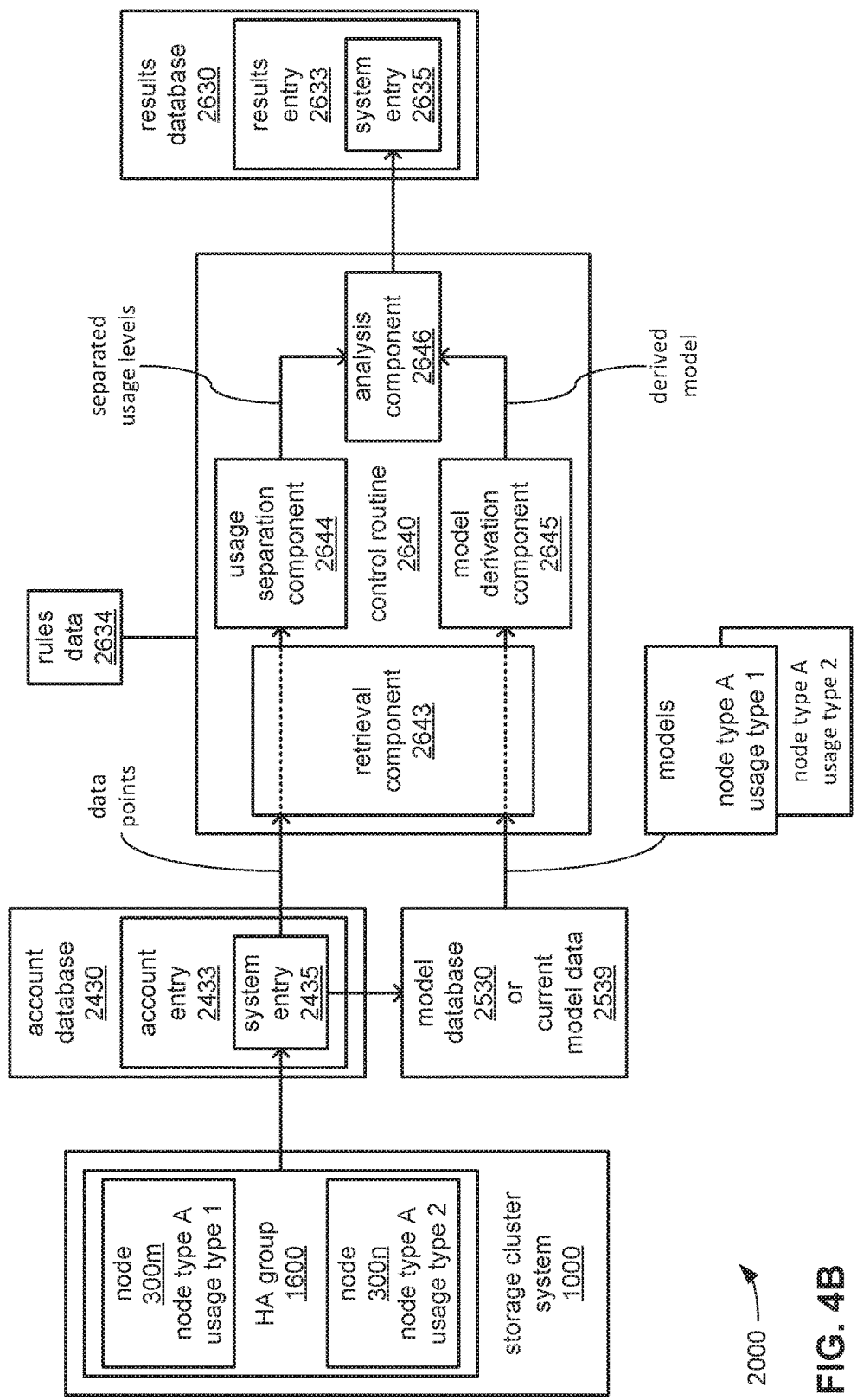
Figure 5:
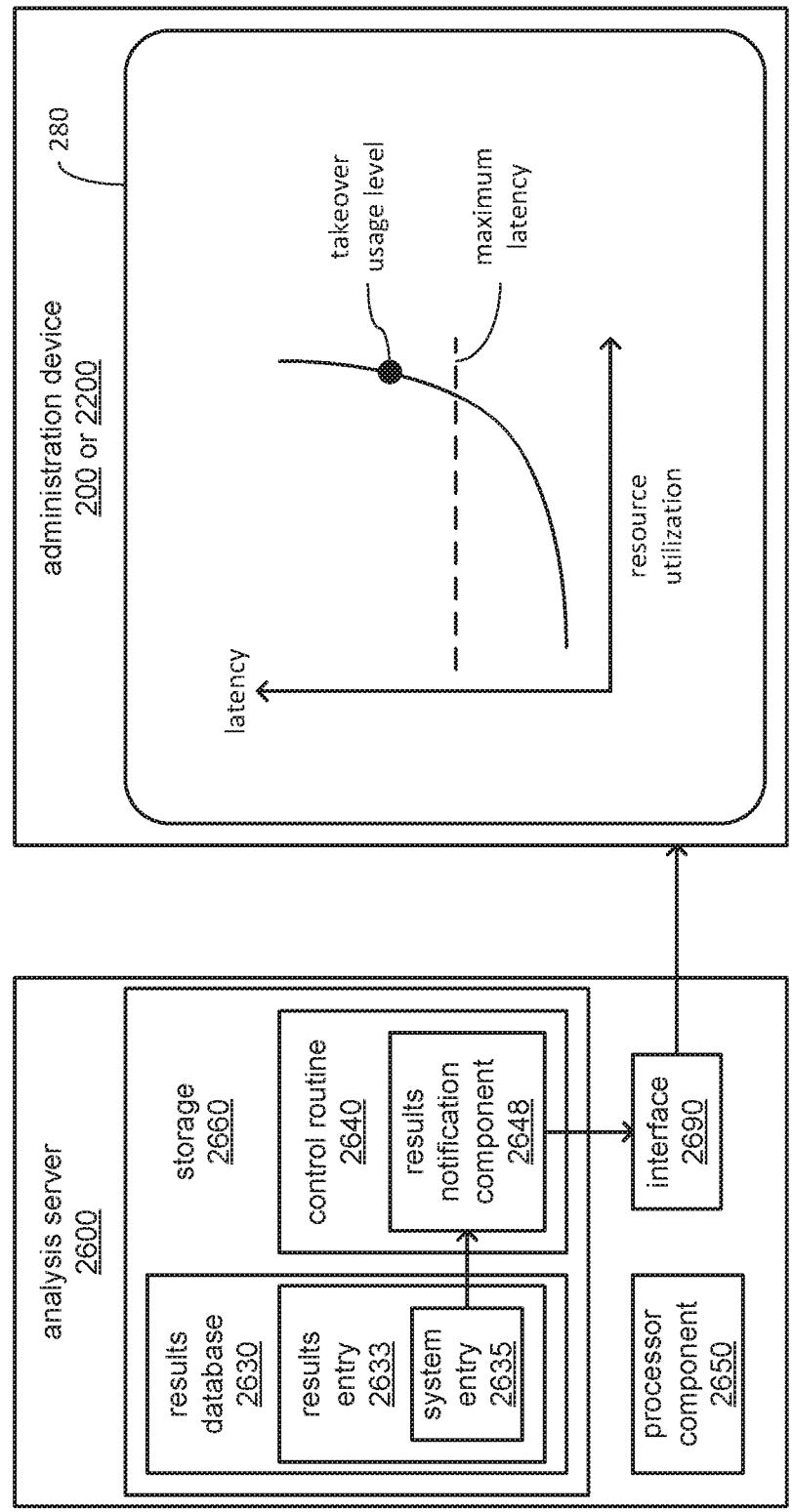

Turning to FIG. 4B in addition to FIG. 4A, as also depicted, the control routine 2640 may incorporate a usage separation component 2644 executable by the processor component 2650 to separate the usage levels indicated in each data point into a portion that arises from the performance of internal processes within the node associated with the data point to maintain its operational status from the portion that arises from that node performing IOPs associated with storage service requests. As further depicted, the control routine 2640 may incorporate a model derivation component 2645 executable by the processor component 2650 to determine what node model to use in determining whether each node among a pair of nodes of a HA group are currently able to take over for the other. In some embodiments, the model derivation component may employ any of a variety of algorithms to combine the node models of two such nodes to generate the single node model that will be used to evaluate the ability of each to take over for the other. In other embodiments, the model derivation component 2645 may select whichever one of the two node models is less conducive to allowing for one of the two nodes to take over for the other. As further depicted, the control routine 2640 may additionally incorporate an analysis component 2646 executable by the processor component 2650 to employ the separated portions of usage levels derived by the usage separation component 2644 and the node model derived by the model derivation component from one or both of the node models associated with the two nodes.

More specifically, to determine whether each of two node of a HA group are currently able to take over for each other, the analysis component 2646 may combine the levels of usage from each of those two nodes that arise from performing IOPs associated with storage service requests with the level of usage from just one of those two nodes that arises from performing internal processes to derive the total level of usage that one of those two nodes would be subjected to if it took over for the other of those two nodes. The analysis component 2646 may then apply that total level of usage to the node model provided by the model derivation component 2645. The analysis component 2646 may then check whether applying that total level of usage to the provided node model reveals that the total level of usage would result in one or more levels of performance that violates a predetermined threshold. If there is a violation of such a predetermined threshold, then the analysis component 2646 may determine that neither of those two nodes is currently able to take over for the other given the current levels of use of each of those two nodes under the usage type(s) to which each of those two nodes are currently subjected. However, if there is no violation of such a predetermined threshold, then the analysis component 2646 may determine that each of those two nodes is currently able to take over for the other.

On each occasion that the analysis component 2646 performs such a check, the analysis component 2646 may store an indication of the resulting determination in the results database 2630. Like the account database 2430, the results database 2630 may be organized into separate results entries 2633 for each operator of one or more storage cluster systems, and may be further organized within each results entry 2633 into separate system entries 2635 for each separate storage cluster system 1000 that may be operated by that operator. The analysis component 2646 may maintain such indications of each determination of whether the nodes of a HA group can take over for each other in the results database 2630 as a long term record for each HA group and/or each storage cluster system.

The analysis component 2646 may recurringly analyze at least a portion of the results database 2630 for each such pair of nodes, and may determine from that analysis whether determinations that neither node is able to take over for the other occur with a frequency great enough to exceed a predetermined maximum threshold of frequency of such occurrences. Alternatively or additionally, the analysis component 2646 may determine whether the frequency of such determinations is increasing such that there is a trend toward eventually exceeding such a predetermined maximum threshold at a later date. If the analysis component 2646 determines that such a threshold has been exceeded or will eventually be exceeded, then the analysis component 2646 may transmit an indication thereof to one or more administration devices 200 and/or 2200 as an alert. Further, the analysis component 2646 may cooperate with one or more administration devices 200 and/or 2200 to provide details of conditions associated with the instances at which neither node of a pair nodes is determined to be able to take over for the other. In so doing, the analysis server may provide one or more graphs indicative of the node model(s) and/or the conditions serving as the basis for each determination, such as the depicted in FIG. 5.

Figure 6:
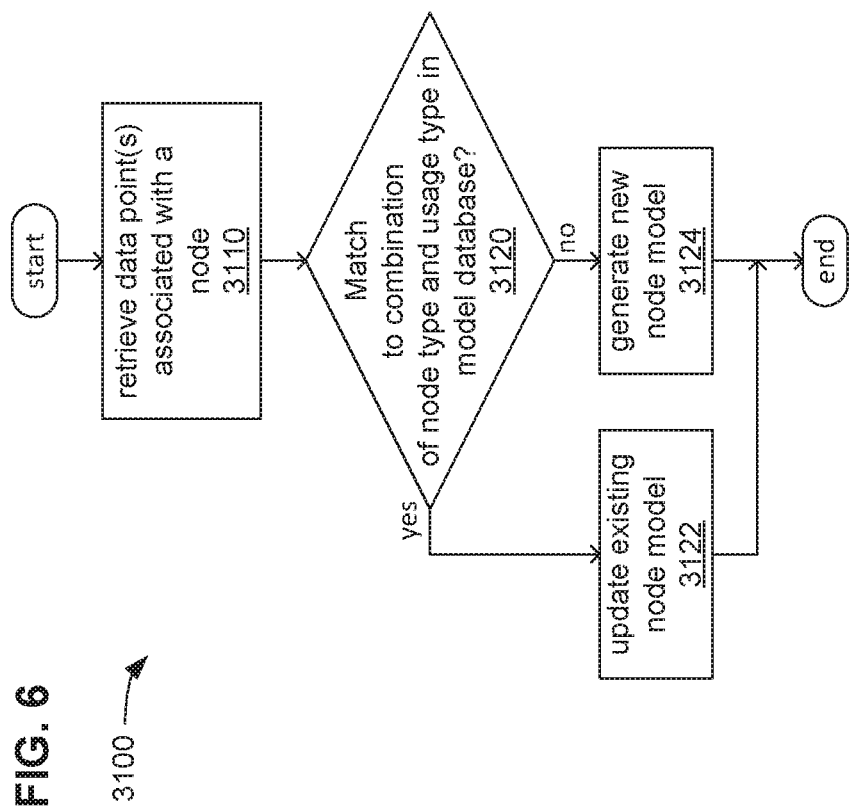
FIG. 6 illustrates a first logic flow according to an embodiment.

FIG. 6 illustrates an embodiment of a logic flow 3100. The logic flow 3100 may be representative of some or all of the operations executed by one or more embodiments described herein. More specifically, the logic flow 3100 may illustrate operations performed by the processor component 2550 in executing at least the control routine 2540, and/or performed by other component(s) of the modeling server 2500. Alternatively, the logic flow 3100 may illustrate operations performed by a processor component and/or other component(s) of a server that combines the functionality of the modeling server 2500 and one or both of the collection server 2400 and the analysis server 2600.

At 3110, a processor component of a server (e.g., the processor component 2550 of the modeling server 2500, or a processor component of a server combining the modeling server 2500 with one or more other servers) may retrieve information concerning one or more data points that each correlate a level of usage of a particular node type under a particular usage type to levels of performance such as a resulting level of utilization of a resource and/or a resulting latency in data propagation.

At 3120, the processor component may check whether there is a match between that particular combination of node type and usage type to a combination of node type and usage type for which a model entry of a model database (e.g., one of the component model entries 2533c of the model database 2530) already exists. Again, the determination of whether there is a match may be based on a determination of whether there is a sufficient degree of a match in usage type as to meet a predetermined minimum matching threshold.

If there is such a match at 3120, then the processor component may augment the model stored within the model entry that is associated with the matching combination of node type and usage type with the one or more data points at 3122. However, if there is no such match at 3120, then the processor component may create a new model entry in which the processor component may store a node model generated from the one or more data points at 3124.

Figure 7:
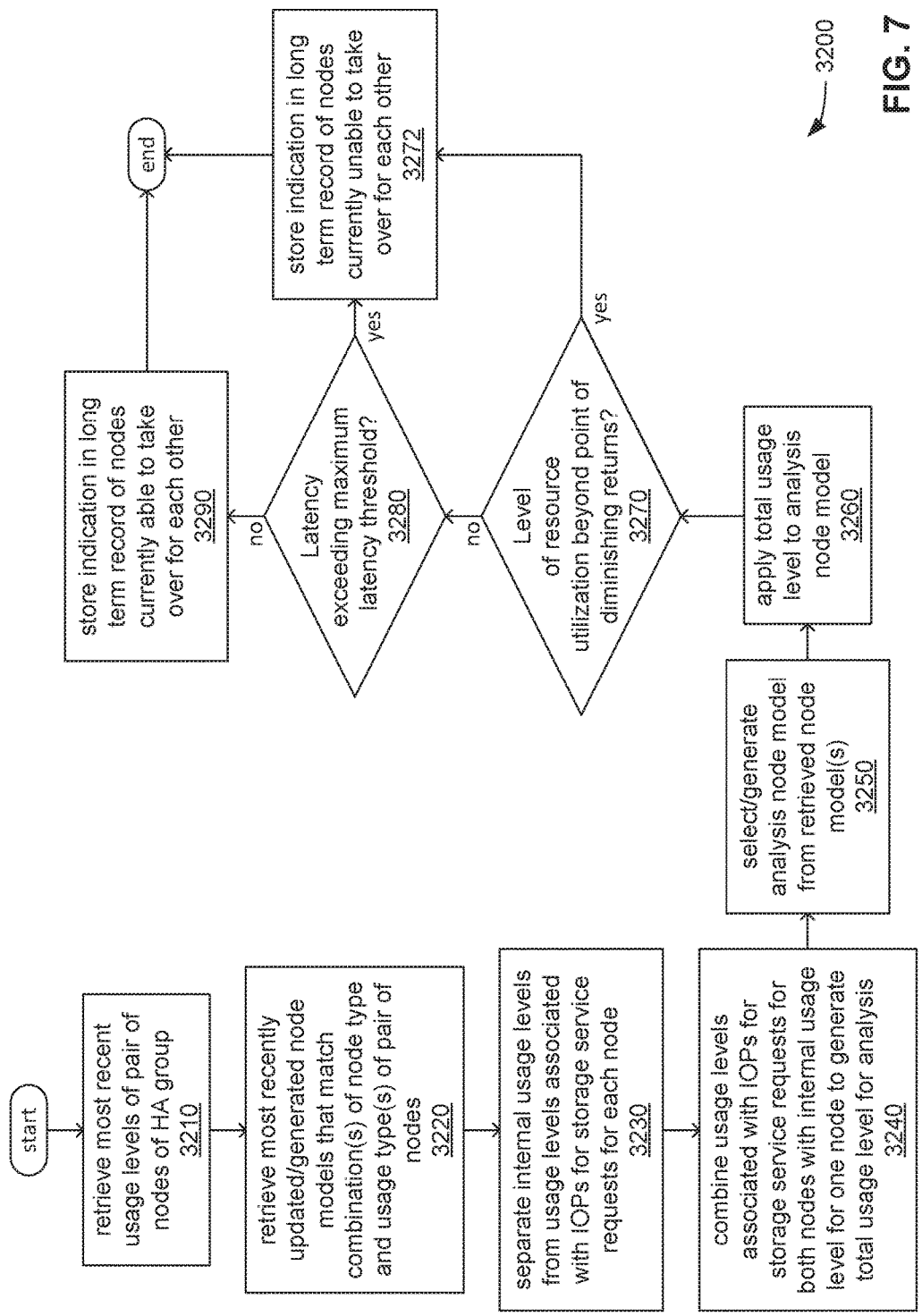
FIG. 7 illustrates a second logic flow according to an embodiment.

FIG. 7 illustrates an embodiment of a logic flow 3200. The logic flow 3200 may be representative of some or all of the operations executed by one or more embodiments described herein. More specifically, the logic flow 3200 may illustrate operations performed by the processor component 2650 in executing at least the control routine 2640, and/or performed by other component(s) of the analysis server 2600. Alternatively, the logic flow 3200 may illustrate operations performed by a processor component and/or other component(s) of a server that combines the functionality of the analysis server 2600 and one or both of the collection server 2400 and the modeling server 2500.

At 3210, a processor component of a server (e.g., the processor component 2650 of the analysis server 2600, or a processor component of a server combining the analysis server 2600 with one or more other servers) may retrieve, from an account entry and/or a system entry of an account database maintained by a collection server (e.g., an account entry 2433 and/or a system entry 2435 of the account database 2430 maintained by the collection server 2400), indications of usage levels of each of a pair of nodes of a HA group of a storage cluster system (e.g., a pair of nodes 300 of a HA group 1600 of a storage cluster system 1000) most recently received from at least one node of that storage cluster system. As has been discussed, data points indicating usage types and/or usage levels for each node of one or more HA groups may be recurringly transmitted by one or more storage cluster systems.

At 3220, the processor component may also retrieve, from one or more model entries of a model database maintained by a modeling server (e.g., a model entry 2533 of the model database 2530 maintained by the modeling server 2500) at least one node model that is associated with the combination of node type(s) of the two nodes and the usage type(s) to which the two nodes have been most recently subjected, and with which the retrieved usage levels are associated. As has been discussed, it is envisioned that all nodes of a HA group are likely to be of the same node type. However, it should be noted that embodiments are possible in which a HA group may include nodes of differing node types. As has also been discussed, it may be likely that nodes of the same HA group are subjected to performing the same usage type simultaneously. However, it should be noted that there may be occasions when different nodes of a HA group are subjected to performing different usage types. Thus, it may be deemed likely that both nodes would be of the same node type and would be subjected to the same usage type such that a single node model may be retrieved for both nodes, and not different node models for each. However, in other embodiments, this may not be the case.

At 3230, for each of the two nodes, the processor component may separate the portion of the usage level for each that is associated with the performance of various internal operations that maintain the functionality of a node from the portion of the usage level for each that is associated with the performance of IOPs associated with storage service requests received from one or more of the client devices 130 to access and/or manipulate client data stored (or to be stored) on one or more storage devices 800. At 3240, the processor component may derive a total usage level for use in analyzing whether each of the two nodes is able to take over for the other by combining the usage levels from both nodes that are associated with the performance of IOPs associated with storage service requests with the usage level associated with the performance of internal operations from one or the other of the two nodes. In so doing and as has been discussed, the processor component may select the higher one of the two usage levels associated with the performance of internal operations.

At 3250, the processor component may derive a node model for use in analyzing the ability of each of the two nodes to take over for the other from the at least one node model that was earlier retrieved. Again, depending on whether the two nodes are of the same node type and have been subjected to the same usage type, only one node model may have been so retrieved such that the one node model that is derived may simply be that one retrieved node model. However, if either the node type or the usage type differ sufficiently between the two nodes, then separate node models may have been retrieved for each. Where separate node models have been so retrieved in some embodiments, the processor component may select the one of the two retrieved node models in which a point of diminishing returns is reached with a lesser level of usage than the other. Alternatively, where separate node models have been so retrieved in other embodiments, the processor component may employ any of a variety of averages, weighted averages and/or other techniques to combine the two retrieved node models into a single node model.

At 3260, the processor component may apply the total usage level derived at 3240 to the node model derived for use in the analyzing the ability of each of the two nodes to take over for the other. At 3270, the processor component may check whether the level of resource utilization indicated by the derived node model with the application of the total usage level corresponds to a point that is beyond the point of diminishing returns. If so, then the processor component may store an indication in a long term record of the two nodes having been found to be currently unable to take over for each other at 3272.

However, if the level of resource utilization does not correspond to a point that is beyond the point of diminishing returns at 3270, then the processor component may check whether the latency of data throughput exceeds a maximum latency threshold at 3280. If so, then the processor component may store an indication in the long term record of the two nodes having been found to be currently unable to take over for each other at 3272. However, if not, then the processor component may store an indication in the long term record of the two nodes having been found to be currently capable of taking over for each other at 3290. As has been discussed, such a long term record may be maintained as one of the results entries 2633 of the results database 2630.

Figure 8:
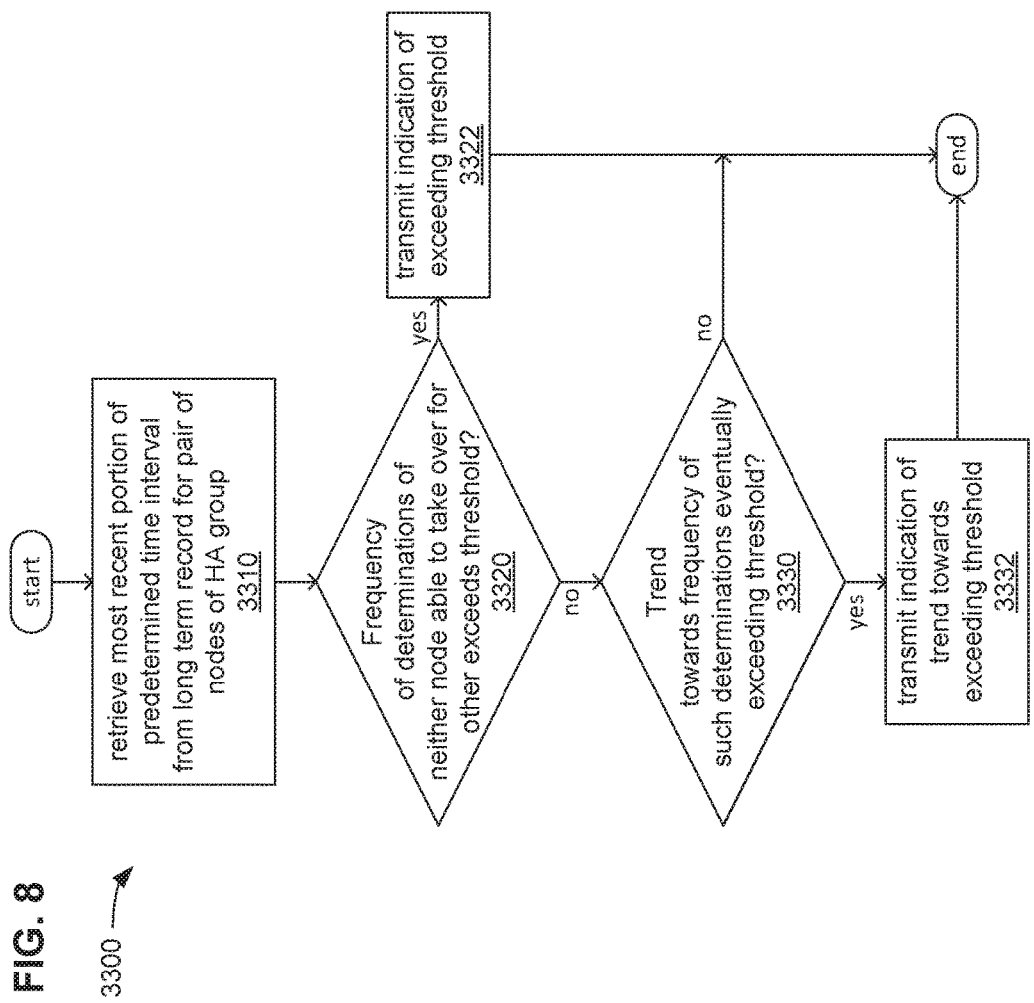
FIG. 8 illustrates a third logic flow according to an embodiment.

FIG. 8 illustrates an embodiment of a logic flow 3300. The logic flow 3300 may be representative of some or all of the operations executed by one or more embodiments described herein. More specifically, the logic flow 3300 may illustrate operations performed by the processor component 2650 in executing at least the control routine 2640, and/or performed by other component(s) of the analysis server 2600. Alternatively, the logic flow 3300 may illustrate operations performed by a processor component and/or other component(s) of a server that combines the functionality of the analysis server 2600 and one or both of the collection server 2400 and the modeling server 2500.

At 3310, a processor component of a server (e.g., the processor component 2650 of the analysis server 2600, or a processor component of a server combining the analysis server 2600 with one or more other servers) may retrieve, from a long term record within a results entry of a results database maintained by the server (e.g., one of the results entries 2633 of the results database 2630), indications of multiple determinations of whether each node of a pair of nodes of a HA group of a storage cluster system (e.g., a pair of nodes 300 of a HA group 1600 of a storage cluster system 1000) that were made over a predetermined interval of time into the past. As has been discussed, and as was detailed in logic flow 3200, the processor component 2650 of the analysis server 2600 may recurringly make determinations of whether two nodes of a HA group are able to take over for each other on a recurring basis, and may store those determinations in a long term record as one of the results entries 2633.

At 3320, the processor component may check whether the frequency at which determinations are made that the two nodes are not able to take over for each other within that predetermined time interval exceeds a threshold. If so, then at 3322, the processor component may transmit an indication to an administration device (e.g., one or more of the administration devices 200 and/or 2200) of a threshold having been exceeded.

However, if no such threshold of frequency has been exceeded at 3320, then processor component may check at 3332 whether the retrieved determinations within the predetermined interval of time indicate that there is a trend towards the frequency of determinations that neither of the two nodes are able to take over for the other will eventually exceed the threshold. If so, then at 3332, the processor component may transmit an indication to an administration device there being a trend towards the threshold eventually being exceeded.

Figure 9:
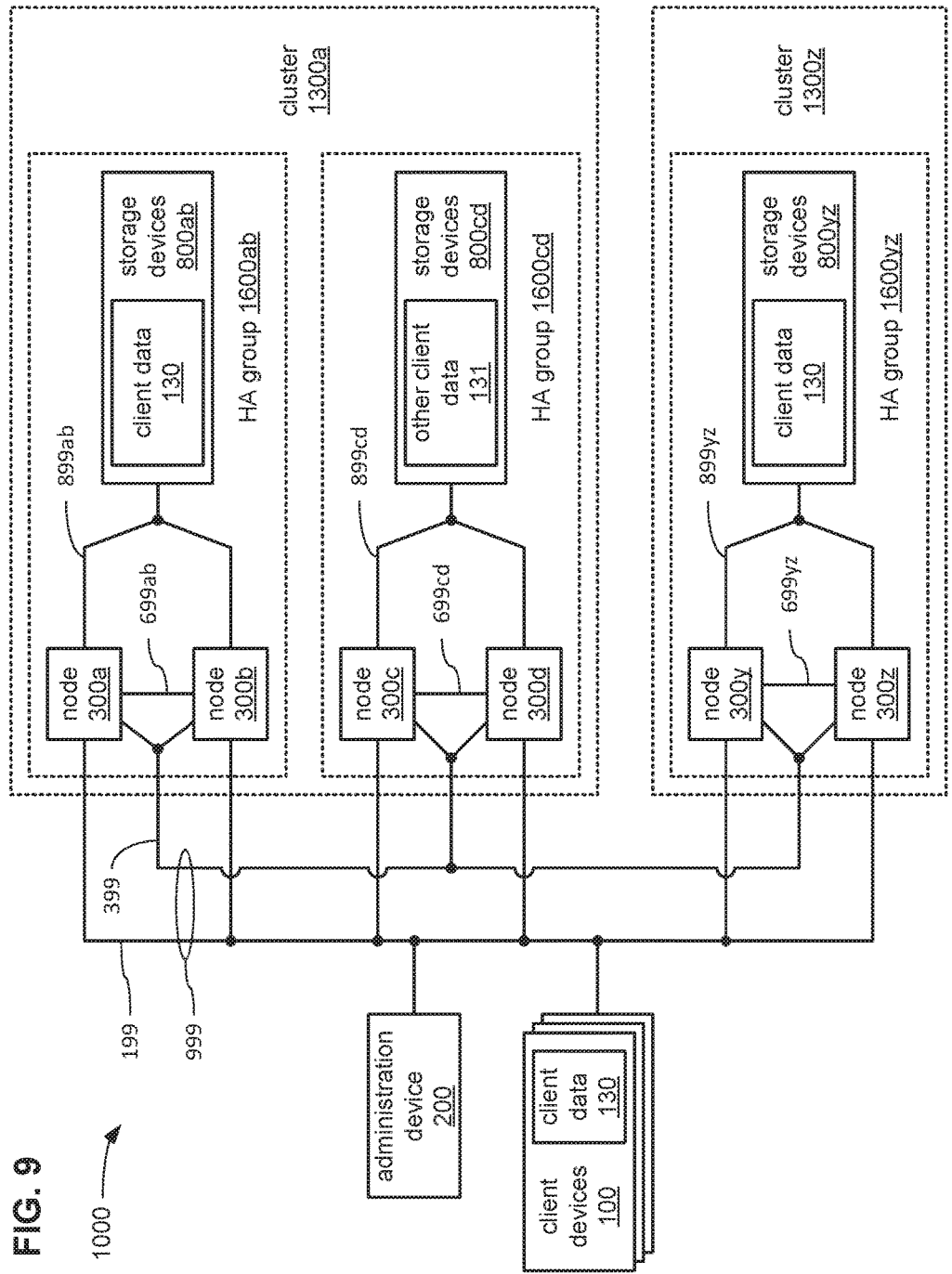
FIG. 9 illustrates an example embodiment of a storage cluster system.

FIG. 9 illustrates a block diagram of an example embodiment of the storage cluster system 1000 incorporating the one or more client devices 100, the one or more administration devices 200, and/or the one or more clusters 1300, such as the depicted clusters 1300a and 1300z. As depicted, the cluster 1300a may incorporate one or more of the nodes 300, such as the depicted nodes 300a-d, and one or more of the storage devices 800, such as the depicted sets of storage devices 800ab and 800cd. As also depicted, the cluster 1300z may incorporate more of the nodes 300, such as the depicted nodes 300y-z, and more of the storage devices 800, such as the depicted sets of storage devices 800yz. As further depicted, the cluster 1300a may include a HA group 1600ab incorporating the nodes 300a-b as partners and the set of storage devices 800ab. The cluster 1300a may also include a HA group 1600cd incorporating the nodes 300c-d as partners and the set of storage devices 800cd. Correspondingly, the cluster 1300z may include a HA group 1600yz incorporating the nodes 300y-z as partners and the set of storage devices 800yz. It should be noted that within the storage cluster system 1000, each of the clusters 1300a and 1300z is an instance of a cluster 1300, each of the sets of storage devices 800ab, 800cd and 800yz represents one or more instances of a storage device 800, and each of the nodes 300a-d and 300y-z is an instance of the node 300 as earlier depicted and discussed in reference to FIG. 1.

In some embodiments, the clusters 1300a and 1300z may be positioned at geographically distant locations to enable a degree of redundancy in storing and retrieving client data 130 provided by one or more of the client devices 100 for storage. Such positioning may be deemed desirable to enable continued access to the client data 130 by one or more of the client devices 100 and/or the administration device 200 despite a failure or other event that may render one or the other of the clusters 1300a or 1300z inaccessible thereto. As depicted, one or both of the clusters 1300a and 1300z may additionally store other client data 131 that may be entirely unrelated to the client data 130.

The formation of the HA group 1600ab with at least the two nodes 300a and 300b partnered to share access to the set of storage devices 800ab may enable a degree of fault tolerance in accessing the client data 130 as stored within the set of storage devices 800ab by enabling one of the nodes 300a-b in an inactive state to take over for its partner in an active state (e.g., the other of the nodes 300a-b) in response to an error condition within that active one of the nodes 300a-b. Correspondingly, the formation of the HA group 1600yz with at least the two nodes 300y and 300z partnered to share access to the set of storage devices 800yz may similarly enable a degree of fault tolerance in accessing the client data 130 as stored within the set of storage devices 800yz by similarly enabling one of the nodes 300y-z in an inactive state to similarly take over for its partner in active state (e.g., the other of the nodes 300y-z).

As depicted, any active one of the nodes 300a-d and 300y-z may be made accessible to the client devices 100 and/or the administration device 200 via a client interconnect 199. As also depicted, the nodes 300a-d and 300y-z may be additionally coupled via an inter-cluster interconnect 399. In some embodiments, the interconnects 199 and 399 may both extend through the same network 999. Each of the interconnects 199 and 399 may be implemented as virtual private networks (VPNs) defined using any of a variety of network security protocols through the network 999. Again, the network 999 may be a single network limited to extending within a single building or other relatively limited area, may include a combination of connected networks extending a considerable distance, and/or may include the Internet. As an alternative to coexisting within the same network 999, the interconnects 199 and 399 may be implemented as entirely physically separate networks. By way of example, the client interconnect 199 may extend through the Internet to enable the client devices 100 and/or the administration device 200 to be positioned at geographically diverse locations, while the inter-cluster interconnect 399 may extend through a leased line between the two geographically distant locations at which each of the clusters 1300a and 1300z are positioned.

As depicted, the partnered nodes within each of the HA groups 1600ab, 1600cd and 1600yz may be additionally coupled via HA interconnects 699ab, 699cd and 699yz, respectively. As also depicted, the nodes within each of the HA groups 1600ab, 1600cd and 1600yz may be coupled to the sets of storage devices 800ab, 800cd and 800yz in a manner enabling shared access via storage interconnects 899ab, 899cd and 899yz, respectively. The partnered nodes and set of storage devices making up each of the HA groups 1600ab, 1600cd and 1600yz may be positioned within relatively close physical proximity to each other such that the interconnects 699ab, 899ab, 699cd, 899cd, 699yz and 899yz may each traverse a relatively short distance (e.g., extending within a room and/or within a cabinet).

More broadly, one or more of the interconnects 199, 399, 699ab, 699cd and 699yz may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Each of the interconnects 899ab, 899cd and 899yz may be based on any of a variety of widely known and used storage interface standards, including and not limited to, SCSI, serially-attached SCSI (SAS), Fibre Channel, etc.

It should be noted that despite the depiction of specific quantities of clusters and nodes within the storage cluster system 1000, other embodiments are possible that incorporate different quantities of clusters and nodes. Similarly, despite the depiction of specific quantities of HA groups and nodes within each of the clusters 1300a and 1300z, other embodiments are possible that incorporate differing quantities of HA groups and nodes. Further, although each of the HA groups 1600ab, 1600cd and 1600yz is depicted as incorporating a pair of nodes 300a-b, 300c-d and 300y-z, respectively, other embodiments are possible in which one or more of the HA groups 1600ab, 1600cd and 1600yz may incorporate more than two nodes.

Figure 10A:
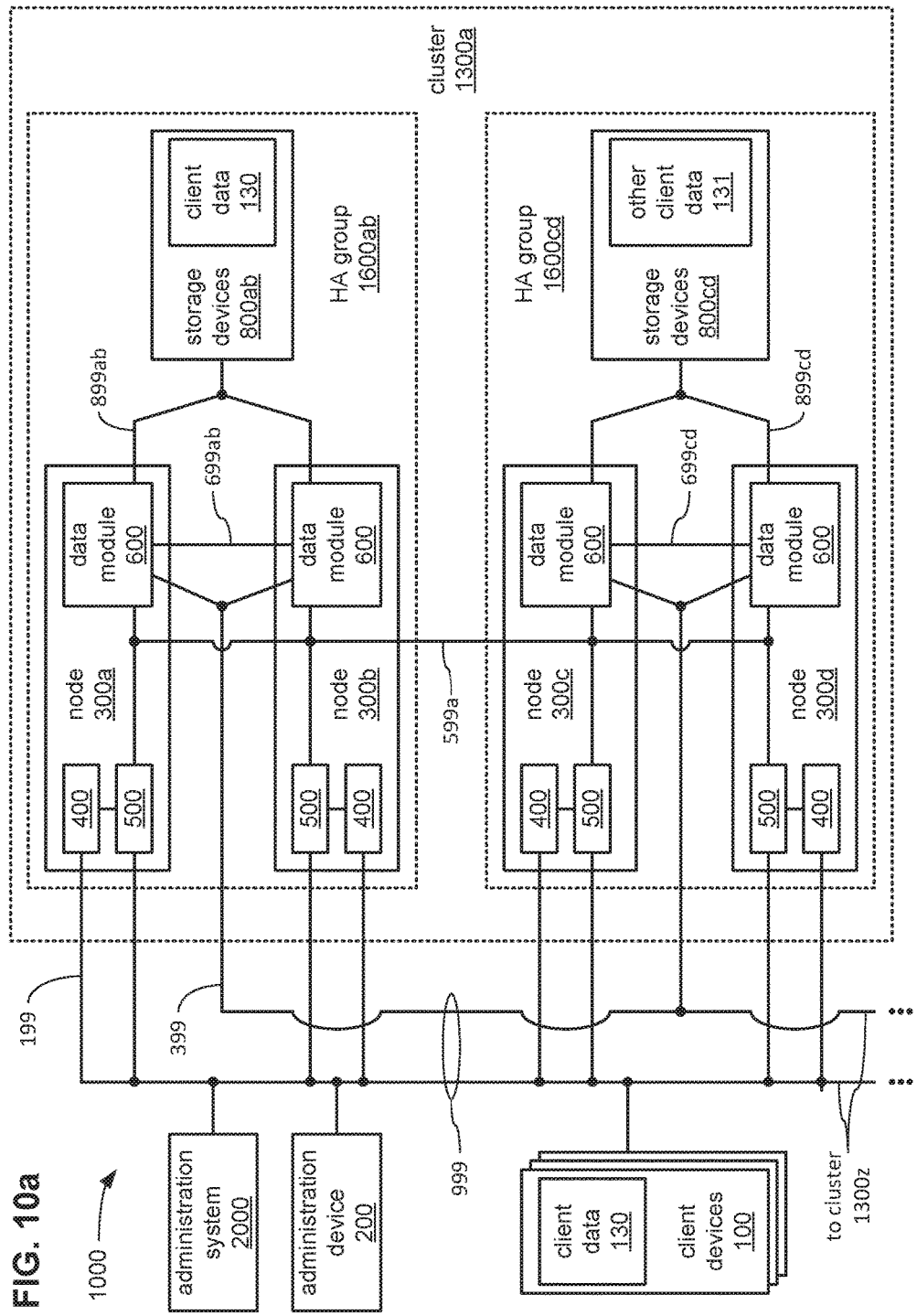
FIG. 10a illustrates an example embodiment of a pair of high availability groups of a cluster.
Figure 10B:
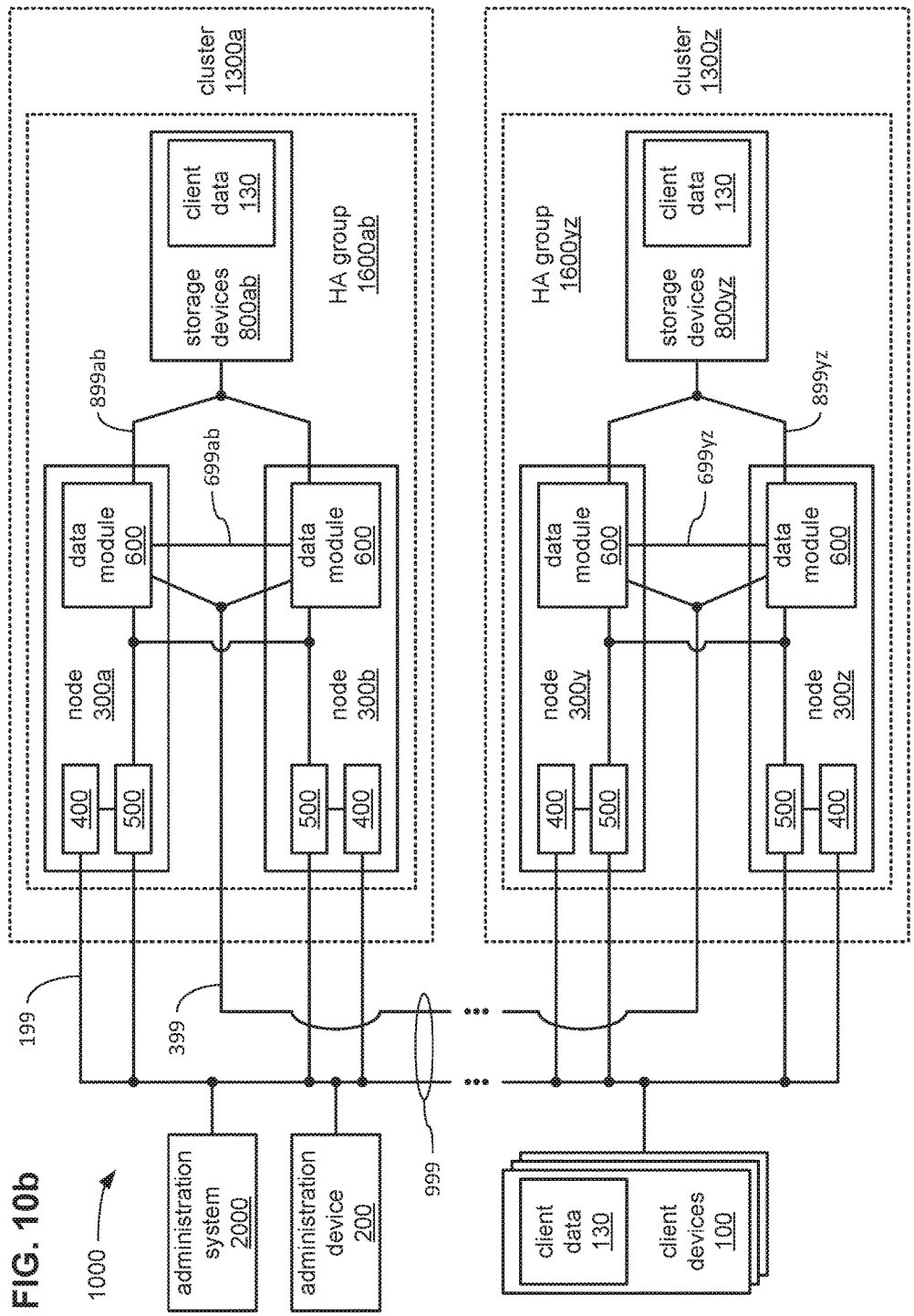
FIG. 10b illustrates an example embodiment of a pair of high availability groups of different clusters.

FIGS. 10a and 10b each illustrate a block diagram of an example portion of the embodiment of the storage cluster system 1000 of FIG. 9 in greater detail. More specifically, FIG. 10a depicts aspects of the nodes 300a-d and interconnections thereamong within the cluster 1300a in greater detail. FIG. 10b depicts aspects of the interconnections among the nodes 300a-b and 300y-z, including interconnections extending between the clusters 1300a and 1300z, in greater detail.

Referring to both FIGS. 10a and 10b, each of the nodes 300a-d and 300y-z may incorporate one or more of a Managing module 400, a Network module 500 and a Data module 600. As depicted, each of the Managing modules 400 and the Network modules 500 may be coupled to the client interconnect 199, by which each may be accessible to one or more of the client devices 100, the administration device 200, and/or to the administration system 2000. The Managing module 400 of one or more active ones of the nodes 300a-d and 300y-z may cooperate with the administration device 200 via the client interconnect 199 to allow an operator of the administration device 200 to configure various aspects of the manner in which the storage cluster system 1000 stores and provides access to the client data 130 provided by one or more of the client devices 100. That same Managing module 400 may also recurringly transmit indications of that configuration and other information concerning the storage cluster system 1000 to the collection server 2400 of the administration system 2000. The Network module 500 of one or more active ones of the nodes 300a-d and 300y-z may receive and respond to requests for storage services received from one or more of the client devices 100 via the client interconnect 199, and may perform a protocol conversion to translate each storage service request into one or more data access commands.

As depicted, the Data modules 600 of all of the nodes 300a-d and 300y-z may be coupled to each other via the inter-cluster interconnect 399. Also, within each of the HA groups 1600ab, 1600cd and 1600yz, Data modules 600 of partnered nodes may share couplings to the sets of storage devices 800ab, 800cd and 800yz, respectively. More specifically, the Data modules 600 of the partnered nodes 300a and 300b may both be coupled to the set of storage devices 800ab via the storage interconnect 899ab, the Data modules 600 of the partnered nodes 300c and 300d may both be coupled to the set of storage devices 800cd via the storage interconnect 899cd, and the Data modules 600 of the partnered nodes 300y and 300z may both be coupled to the set of storage devices 800yz via the storage interconnect 899yz. The Data modules 600 of active ones of the nodes 300a-d and 300y-z may perform the data access commands derived by one or more of the Network modules 500 of these nodes from translating storage service requests received from one or more of the client devices 100.

Thus, the Data modules 600 of active ones of the nodes 300a-d and 300y-z may access corresponding ones of the sets of storage devices 800ab, 800cd and 800yz via corresponding ones of the storage interconnects 899ab, 899cd and 899yz to store and/or retrieve client data 130 as part of performing the data access commands. The data access commands may be accompanied by portions of the client data 130 to store and/or newer portions of the client data 130 with which to update the client data 130 as stored. Alternatively or additionally, the data access commands may specify portions of the client data 130 to be retrieved from storage for provision back to one or more of the client devices 100.

Further, and referring to FIG. 10b, the Data module 600 of an active one of the nodes 300a-b and 300y-z of one of the clusters 1300a or 1300z may replicate the data access commands and transmit the resulting replica data access commands via the inter-cluster interconnect 399 to another active one of the nodes 300a-b and 300y-z of the other of the clusters 1300a or 1300z to enable at least partial parallel performance of the data access commands by two of the Data modules 600. In this way, the state of the client data 130 as stored within one of the sets of storage devices 800ab or 800yz may be mirrored within the other of the sets of storage devices 800ab or 800yz, as depicted.

Such mirroring of the state of the client data 130 between multiple sets of storage devices associated with different clusters that may be geographically distant from each other may be deemed desirable to address the possibility of the nodes of one of the clusters becoming inaccessible as a result of a regional failure of the client interconnect 199 (e.g., as a result of a failure of a portion of the network 999 through which a portion of the client interconnect extends in a particular geographic region). As familiar to those skilled in the art, the use of additional interconnect(s) between partnered nodes of a HA group (e.g., the HA interconnects 699ab, 699cd and 699yz) tends to encourage physically locating partnered nodes of a HA group in close proximity to each other such that a localized failure of a network may render all nodes of a HA group inaccessible to the client devices 100. For example, a failure of a portion of a network that includes the client interconnect 199 in the vicinity of both of the nodes 300a and 300b may render both of the nodes 300a and 300b inaccessible to the client devices 100 such that the client data 130 stored within the sets of storage devices 800ab becomes inaccessible through either of the nodes 300a or 300b. With both of the sets of the storage devices 800ab and 800yz mirroring the state of the client data 130, the client devices 100 are still able to access the client data 130 within the set of storage devices 800yz, despite the loss of access to the set of storage devices 800ab.

Referring again to both FIGS. 10a and 10b, and as previously discussed, the sharing of access via the storage interconnects 899ab, 899cd and 899yz to each of the sets of storage devices 800ab, 800cd and 800yz, respectively, among partnered ones of the nodes 300a-d and 300y-z may enable continued access to one of the sets of storage devices 800ab, 800cd and 800yz in the event of a failure occurring within one of the nodes 300a-d and 300y-z. The coupling of Data modules 600 of partnered ones of the nodes 300a-d and 300y-z within each of the HA groups 1600ab, 1600cd and 1600yz via the HA interconnects 699ab, 699cd and 699yz, respectively, may enable such continued access in spite of such a failure. Through the HA interconnects 699ab, 699cd or 699yz, Data modules 600 of each of these nodes may each monitor the status of the Data modules 600 their partners. More specifically, the Data modules 600 of the partnered nodes 300a and 300b may monitor each other through the HA interconnect 699ab, the Data modules 600 of the partnered nodes 300c and 300d may monitor each other through the HA interconnect 699cd, and the Data modules 600 of the partnered nodes 300y and 300z may monitor each other through the HA interconnect 699yz.

Such monitoring may entail recurring exchanges of "heartbeat" and/or other status signals (e.g., messages conveying the current state of performance of a data access command) via one or more of the HA interconnects 699ab, 699cd or 699yz in which an instance of an absence of receipt of such a signal within a specified recurring interval may be taken as an indication of a failure of the one of the Data modules 600 from which the signal was expected. Alternatively or additionally, such monitoring may entail awaiting an indication from a monitored one of the Data modules 600 that a failure of another component of one of the nodes 300a-d or 300y-z has occurred, such as a failure of a Managing module 400 and/or of a Network module 500 of that one of the nodes 300a-d or 300y-z. In response to such an indication of failure of an active one of the nodes 300a-d or 300y-z belonging to one of the HA groups 1600ab, 1600cd or 1600yz, an inactive partner among the nodes 300a-d or 300y-z of the same one of the HA groups 1600ab, 1600cd or 1600yz may take over. Such a "takeover" between partnered ones of the nodes 300a-d or 300y-z may be a complete takeover inasmuch as the partner that is taking over may take over performance of all of the functions that were performed by the failing one of these nodes.

However, in some embodiments, at least the Network modules 500 and the Data modules 600 of multiple ones of the nodes 300a-d and/or 300y-z may be interconnected in a manner enabling a partial takeover in response to the failure of a portion of one of the nodes 300a-d or 300y-z. Referring more specifically to FIG. 10a, the Network modules 500 of each of the nodes 300a-d may be coupled to the Data modules 600 of each of the nodes 300a-d via an intra-cluster interconnect 599a. In other words, within the cluster 1300a, all of the Network modules 500 and all of the Data modules 600 may be coupled to enable data access commands to be exchanged between Network modules 500 and Data modules 600 of different ones of the nodes 300a-d. Thus, by way of example, where the Network module 500 of the node 300a has failed, but the Data module 600 of the node 300a is still operable, the Network module 500 of its partner node 300b (or of one of the nodes 300c or 300d with which the node 300a is not partnered in a HA group) may take over for the Network module 500 of the node 300a.

Although the clusters 1300a and 1300z may be geographically distant from each other, within each of the clusters 1300a and 1300z, nodes and/or components of nodes may be positioned within relatively close physical proximity to each other such that the intra-cluster interconnects 599a and 599z may each traverse a relatively short distance (e.g., extending within a room and/or within a single cabinet). More broadly, one or more of the intra-cluster interconnects 599a and 599z may be based on any of a variety (or combination) of communications technologies by which signals may be exchanged, including without limitation, wired technologies employing electrically and/or optically conductive cabling, and wireless technologies employing infrared, radio frequency or other forms of wireless transmission. By way of example, the intra-cluster interconnect 599a may be made up of a mesh of point-to-point interconnects coupling each Network module 500 of each of the nodes 300a-d to each Data module 600 of each of the nodes 300a-d. Alternatively, by way of another example, the intra-cluster interconnect 599a may include a network switch (not shown) to which each of the Network modules 500 and each of the Data modules 600 of the nodes 300a-d may be coupled.

The Managing module 400 of one or more of the active ones of the nodes 300a-d and 300y-z may recurringly retrieve indications of status from the Network modules 500 and/or Data modules 600 within the same node and/or from others of the nodes 300a-d and 300y-z. Where necessary, such a Managing module 400 may indirectly retrieve such information from one or more Network modules 500 and/or Data modules 600 through one or more other Managing modules 400. Among such retrieved indications may be indications of a failure in a Network module 500 and/or a Data module 600, and such a failure may have prompted a partial or a complete takeover by one of the nodes 300a-d and 300y-z of functions performed by another of the nodes 300a-d and 300y-z. Correspondingly, following a repair or other correction to address such a failure, the retrieved indications may include an indication of a "give-back" event in which a partial or complete takeover is reversed. In some embodiments, a Managing module 400 that recurringly retrieves such indications of status may recurringly transmit those indications to the collection server 2400 of the administration system 2000. Alternatively or additionally, that Managing module 400 may generate a summary or other form of aggregation of such events as takeovers and give-backs to transmit to the collection server 2400.

It should also be noted that despite the depiction of only a single one of each of the Managing module 400, the Network module 500 and the Data module 600 within each of the nodes 300a-d and 300y-z, other embodiments are possible that may incorporate different quantities of one or more of the Managing module 400, the Network module 500 and the Data module 600 within one or more of these nodes. By way of example, embodiments are possible in which one or more of the nodes 300a-d and/or 300y-z incorporate more than one Network module 500 to provide a degree of fault-tolerance within a node for communications with one or more of the client devices 100, and/or incorporate more than one Data module 600 to provide a degree of fault-tolerance within a node for accessing a corresponding one of the sets of storage devices 800ab, 800cd or 800yz.

FIG. 11 illustrates a block diagram of an example embodiment of the HA group 1600ab of the cluster 1300a of the embodiment of the storage cluster system 1000 of FIG. 9 in greater detail. As depicted, of the nodes 300a and 300b of the HA group 1600ab, the node 300a may be active to engage in communications with a client device 100 and/or the administration device 200, and may be active to perform operations altering the client data 130 within the set of storage devices 800ab, while the node 300b may be inactive and awaiting a need to take over for the node 300a. More specifically, the Managing module 400 and the Network module 500 of the node 300a may engage in communications with the client devices 100, the administration device 200 and/or the collection server 2400 of the administration system 2000 (as indicated with the Managing module 400 and the Network module 500 of the node 300a being drawn with solid lines), while the Managing module 400 and the Network module 500 of the node 300b may not (as indicated with the Managing module 400 and the Network module 500 being drawn with dotted lines).

In various embodiments, the Managing module 400 of each of the nodes 300a-b incorporates one or more of a processor component 450, a memory 460 and an interface 490 to couple the Managing module 400 to at least the client interconnect 199. The memory 460 may store a control routine 440. The control routine 440 may incorporate a sequence of instructions operative on the processor component 450 in its role as a main processor component of the Managing module 400 to implement logic to perform various functions. As a result of the node 300a being active to engage in communications with one or more of the client devices 100 and/or the administration device 200, the processor component 450 of the Managing module 400 of the node 300a may be active to execute the control routine 440. In contrast, as a result of the node 300b being inactive, the processor component 450 may not be active to execute the control routine 440 within the Managing module 400 of the node 300b. However, if the node 300b takes over for the node 300a, then the control routine 440 within the node 300b may begin to be executed, while the control routine 440 within the node 300a may cease to be executed.

In executing the control routine 440, the processor component 450 of the Managing module 400 of the active node 300a may operate the interface 490 to accept remotely supplied configuration data. In some embodiments, such remote configuration data may emanate from the administration device 200. By way of example, which one(s) of the nodes 300b-d or 300y-z may be partnered to form one or more HA groups (e.g., the HA groups 1600ab, 1600cd or 1600yz) may be remotely configured, as well as what nodes and/or HA groups may cooperate to provide further fault tolerance (e.g., geographically dispersed fault tolerance), what network addresses may be allocated to one or more of the nodes 300a-d and/or 300y-z on various interconnects, etc. In other embodiments, such remote configuration may emanate from one or more of the client devices 100. The processor component 450 may provide a web server, telnet access, instant messaging and/or other communications service(s) by which such aspects of operation may be remotely configured from the administration device 200 or one or more of the client devices 100 via the client interconnect 199. Regardless of the exact manner in which configuration information is remotely provided, as the processor component 450 receives such configuration information and/or subsequent to receiving such information, the processor component 450 may operate the interface 490 to relay it and/or updates thereto to the Network module 500 and/or the Data module 600 as a portion of metadata. Alternatively or additionally, the processor component 450 may also operate the interface 490 to relay such configuration information and/or updates thereto to the collection server 2400 of the administration system 2000.

In various embodiments, the Network module 500 of each of the nodes 300a-b incorporates one or more of a processor component 550, a memory 560 and an interface 590 to couple the Network module 500 to one or both of the client interconnect 199 and the intra-cluster interconnect 599a. The memory 560 may store a control routine 540. The control routine 540 may incorporate a sequence of instructions operative on the processor component 550 in its role as a main processor component of the Network module 500 to implement logic to perform various functions. As a result of the node 300a being active to engage in communications with one or more of the client devices 100 and to perform data access commands, the processor component 550 of the Network module 500 of the node 300a may be active to execute the control routine 540. In contrast, as a result of the node 300b being inactive, the processor component 550 may not be active to execute the control routine 540 within the N-module of the node 300b. However, if the node 300b takes over for the node 300a, then the control routine 540 within the node 300b may begin to be executed, while the control routine 540 within the node 300a may cease to be executed.

In executing the control routine 540, the processor component 550 of the Network module 500 of the active node 300a may operate the interface 590 to perform various tests to detect other devices with which to communicate and/or assign network addresses by which other devices may be contacted for communication. At least as part of rebooting following being reset or powered on, the processor component 550 may perform various tests on the client interconnect 199 and/or the intra-cluster interconnect 599a to determine addresses and/or communications protocols for communicating with one or more components (e.g., Managing modules 400, Network modules 500 and/or Data modules 600) of one or more of the nodes 300a-d and/or 300y-z. Alternatively or additionally, in embodiments in which at least a portion of the intra-cluster interconnect 599a supports internet protocol (IP) addressing, the processor component 550 may function in the role of a dynamic host control protocol (DHCP) server to assign such addresses. Also alternatively or additionally, the processor component 550 may receive configuration information from the Managing module 400 (e.g., a portion of metadata).

In some embodiments, configuration information received from the Managing module 400 may be employed by the processor component 550 in performing such tests on the client interconnect 199 and/or the intra-cluster interconnect 599a (e.g., the configuration information so received may include a range of IP addresses to be tested). As the processor component 550 performs such tests and/or subsequent to performing such tests, the processor component 550 may operate the interface 590 to relay indications of the results of those tests and/or updates thereto to the Data module 600 as a portion of metadata. Further, as the processor component 550 interacts with one or more of the client devices 100 and/or other devices, the processor component 550 may detect changes in information determined from the performance of various tests, and may operate the interface 590 to provide indications of those changes to the Data module 600 as portions of updated metadata.

In some embodiments, as the processor component 550 of each Network module 500 that performs such tests, those processor components 550 may also operate their respective interfaces 590 to relay the results of those tests and/or updates thereto to the Managing module 400 that is in communication with the collection server 2400, either directly thereto, or through another intervening Managing module 400. The Managing module 400 in communication with the collection server 2400 may also transmit a copy of the portions of metadata as originally generated and as updated by the results of those tests. Differences in the portions of metadata preceding and following such updates may provide an indication to be stored by the collection server 2400 of an attempt to configure the storage cluster system 1000 that is being defeated by a condition affecting a portion of an interconnect and/or another factor.

In further executing the control routine 540, the processor component 550 may operate the interface 590 to exchange storage service requests, responses thereto and/or client data 130 with one or more of the client devices 100 via the client interconnect 199. The client devices 100 and the Network module(s) 500 of one or more active ones of the nodes 300a-d and 300y-z may interact with each other via the client interconnect 199 in accordance with a client/server model for the handling of client data 130. Stated differently, each of the client devices 100 may issue requests for storage services related to the storage of client data 130 to one or more of the nodes 300a-d and 300y-z that are active to engage in communications with the client devices 100. In so doing, the client devices 100 and the Network module 500 may exchange packets over the client interconnect 199 in which storage service requests may be transmitted to the Network module 500, responses (e.g., indications of status of handling of the requests) may be transmitted to the client devices 100, and client data 130 may be exchanged therebetween. The exchanged packets may utilize any of a variety of file-based access protocols, including and not limited to, Common Internet File System (CIFS) protocol or Network File System (NFS) protocol, over TCP/IP. Alternatively or additionally, the exchanged packets may utilize any of a variety of block-based access protocols, including and not limited to, Small Computer Systems Interface (SCSI) protocol encapsulated over TCP (iSCSI) and/or SCSI encapsulated over Fibre Channel (FCP).

Also in executing the control routine 540, the processor component 550 may operate the interface 590 to exchange commands and/or data, including client data 130, with the Data module 600 via the intra-cluster interconnect 599a. Such exchanges of commands and/or data may or may not employ a protocol in which packets are used. In some embodiments, data access commands to effect exchanges of client data 130 may be exchanged through the intra-cluster interconnect 599a in a manner that may be agnostic of any particular file system that may be selected for use in storing the client data 130 within the set of storage devices 800ab. More specifically, the manner in which portions of client data 130 may be referred to in data access commands to store and/or retrieve client data 130 may entail identification of file names, identification of block identifiers, etc. in a manner meant to be independent of a selection of a file system.

Given the possible differences in protocols and/or other aspects of communications, the processor component 550 may be caused to translate between protocols employed in communications with one or more of the client devices 100 via the client interconnect 199 and protocols employed in communications with the Data module 600 via the intra-cluster interconnect 599a. Alternatively or additionally, one or more of the protocols employed in communications via the client interconnect 199 may employ file and/or block identification in a manner enabling a minimal degree of protocol translation between such communications and communications via the intra-cluster interconnect 599a.

In performing such protocol translations, the processor component 550 may be caused to relay a storage service request from one of the client devices 100 to the Data module 600 as one or more data access commands to store and/or retrieve client data 130. More specifically, a request received via the client interconnect 199 for storage services to retrieve client data 130 may be converted into one or more data access commands conveyed to the Data module 600 via the intra-cluster interconnect 599a to retrieve client data 130 from the set of storage devices 800ab and to provide the client data 130 to the Network module 500 to be relayed by the Network module 500 back to the requesting one of the client devices 100. Also, a request received via the client interconnect 199 for storage services to store client data 130 may be converted into one or more data access commands conveyed to the Data module 600 via the intra-cluster interconnect 599a to store the client data 130 within the set of storage devices 800ab.

In various embodiments, the Data module 600 of each of the nodes 300a-b incorporates one or more of a processor component 650, a memory 660, a storage controller 665 to couple the Data module 600 to the set of storage devices 800ab via the storage interconnect 899ab, and an interface 690 to couple the Data module 600 to one or more of the intra-cluster interconnect 599a, the inter-cluster interconnect 399 and the HA interconnect 699ab. The memory 660 stores one or more of a control routine 640 and metadata 630ab. Also, and as will be explained in greater detail, in the Data module 600 of the node 300a, a portion of the memory 660 may be allocated to serve as a synchronization cache (sync cache) 639a, while a portion of the memory 660 may be similarly allocated to serve as a sync cache 639b in the D-module of the node 300b. The control routine 640 incorporates a sequence of instructions operative on the processor component 650 in its role as a main processor component of the Data module 600 to implement logic to perform various functions. However, as a result of the node 300a being active to engage in communications with one or more of the client devices 100 and to perform data access commands, a different portion of the control routine 640 may be executed by the processor component 650 of the Data module 600 of the node 300a from a portion of the control routine 640 that may be executed by the processor component 650 of the D-module of the node 300b. As a result, different logic may be implemented by the executions of different portions of the control routine 640 within each of these Data modules 600.

In executing the control routine 640, the processor component 650 of the Data module 600 of the active node 300a may operate the interface 690 to receive portions of metadata and/or updates thereto from the Managing module 400 and/or the Network module 500 via the intra-cluster interconnect 599a. Regardless of whether aspects of the operation of at least the node 300a are remotely configured via the Managing module 400 and/or are configured based on the results of tests performed by the Network module 500, the processor component 650 may generate the metadata 630ab from those received metadata portions indicating the resulting configuration of those aspects, and may store the metadata 630ab within the memory 660 for subsequent use by the processor component 650. The processor component 650 may repeat the generation of the metadata 630ab in response to receiving updated portion(s) of metadata from the Managing module 400, the Network module 500 and/or other possible sources of updated metadata portions, thereby creating an updated version of the metadata 630ab which the processor component 650 may store within the memory 660 in place of earlier version(s). Following generation of the metadata 630ab and/or each updated version thereof, the processor component 650 may store the metadata 630ab within the set of storage devices 800ab for later retrieval during a subsequent rebooting of at least the Data module 600 of the node 300a.

Also following generation of the metadata 630ab and/or each updated version thereof, the processor component 650 of the Data module 600 of the node 300a may operate the interface 690 to transmit a duplicate of the metadata 630ab to the Data module 600 of the inactive node 300b via the HA interconnect 699ab to enable the node 300b to more speedily take over for the active node 300a in response to a failure within the node 300a. In this way, the node 300b is directly provided with the metadata 630ab and/or updated versions thereof to provide information needed by the node 300b to more readily take over communications with one or more client devices, take over communications with one or more others of the nodes 300c-d and/or 300y-z, and/or take over control of and/or access to the set of storage devices 800ab.

Still further following generation of the metadata 630*ab* and/or each updated version thereof, the processor component 650 of the Data module 600 of the node 300*a* may operate the interface 690 to transmit a portion of the metadata 630*ab* to the Data module 600 of an active one of the nodes 300*y-z* of the HA group 1600*yz* of the other cluster 1300*z*. Alternatively or additionally, the processor component 650 of the Data module 600 of the node 300*a* may operate the interface 690 to transmit metadata portion(s) received from the Managing module 400 and/or the Network module 500 of the node 300*a* to the active one of the nodes 300*y-z*. Such metadata portion(s) may include indications of aspects of operation of all of the nodes 300*a-b* and 300*y-z* together in storing and/or providing access to the client data 130, and may be provided to the active one of the nodes 300*y-z* as an input to other metadata that may be separately generated and/or maintained by the nodes 300*y-z*.

In some embodiments, as the processor component 650 of at least the Data module 600 receives metadata portions (or updates thereto) and generates each new version of the metadata 630*ab*, the processor component 650 may operate the interface 690 to relay each new version of the metadata 630*ab* to the Managing module 400 that is in communication with the collection server 2400 of the administration system 2000 through one or more Network modules 500. As previously discussed, the Managing module 400 in communication with the collection server 2400 may also transmit a copies of the portions of metadata from which the metadata 630*ab* is derived, and in so doing, may transmit a copy of the metadata 630*ab* with those metadata portions.

In further executing the control routine 640, the processor component 650 of the Data module 600 of the node 300*a* may operate the set of storage devices 800*ab* through the storage controller 665 to store and retrieve client data 130 in response to data access commands to do so received via the intra-cluster interconnect 599*a*, as has been described. The processor component 650 may operate the interface 690 to receive the data access commands from and/or exchange data (including client data 130) with the Network module 500 via the intra-cluster interconnect 599*a*. The processor component 650 may be caused to retry the performance of a data access command to store or retrieve client data 130 at least in response to the occurrence of a short term failure in performance (e.g., a failure that is likely to be resolved relatively quickly). However, if the failure in performance is a longer term failure (e.g., a failure that cannot be resolved quickly and/or requires intervention of personnel), then a takeover may occur in which, for example, the node 300*b* becomes the new active node of the HA group 1600*ab*.

In addition to operating the storage controller 665 to execute data access commands to store client data 130 within the set of storage devices 800*ab* and/or retrieve client data 130 therefrom, the processor component 650 of the Data module 600 of the node 300*a* may also replicate the data access commands and operate the interface 690 to transmit the resulting replica data access commands via the inter-cluster interconnect 399 to a Data module 600 of an active one of the nodes 300*y-z* of the HA group 1600*yz* of the other cluster 1300*z*. As has been discussed, the transmission of such replica data access commands to an active node of another HA group may provide an additional degree of fault tolerance in the storage and/or retrieval of client data 130 in which the replica data access commands may be performed by an active node of another cluster at least partly in parallel with the performance of the original data access command by the node 300*a*. The processor component 650 may be caused to retry the transmission of such replica data access commands to either the same active one of the nodes 300*y-z* within the HA group 1600*yz* and/or to a different inactive one of the nodes 300*y-z* within the HA group 1600*yz* in response to indications of errors in either the receipt or performance of the replica data access commands. Retrying transmission of replica data access commands to an inactive one of the nodes 300*y-z* may cause or arise from a takeover of the active one of the nodes 300*y-z* by the inactive one thereof.

In support of such exchanges of replica data access commands and responses thereto between the Data module 600 of the node 300*a* and a Data module 600 of an active one of the nodes 300*y-z*, the processor component 650 of the Data module 600 of the node 300*a* may employ information included within the metadata 630*ab* to form an active communications session with the Data module 600 of that other active node through the inter-cluster interconnect 399. The processor component 650 may additionally form an inactive communications session with a D-module of the inactive one of the nodes 300*y-z* through the inter-cluster interconnect 399 in preparation for retrying a transmission of a replica data access command to the Data module 600 of that inactive node. Further, if the processor component 650 retries the transmission of a replica data access command to the Data module 600 of that inactive one node, then the processor component 650 may act to change the state of the inactive communications session formed with the Data module 600 of that inactive node from inactive to active.

In executing the control routine 640, the processor component 650 of the Data module 600 of the inactive node 300*b* may operate the interface 690 to receive the metadata 630*ab* and/or updates thereto from the Data module 600 of the node 300*a* via the HA interconnect 699*ab*. The processor component 650 may then store the received metadata 630*ab* and/or the received updates thereto within the memory 660 for subsequent use. Again, provision of the metadata 630*ab* and updates thereto directly to the node 300*b* by the node 300*a* may be deemed desirable to enable the node 300*b* to more quickly take over for the node 300*a* (thereby transitioning from being an inactive node of the HA group 1600*ab* to becoming the active node of the HA group 1600*ab*) in response to a failure occurring within the node 300*a*. More specifically, with the metadata 630*ab* already provided to the Data module 600 of the node 300*b*, the need for the processor component 650 of the Data module 600 of the node 300*b* to take additional time to retrieve the metadata 630*ab* from other sources is alleviated. More precisely, the need for the processor component to retrieve the metadata 630*ab* from the set of storage devices 800*ab*, or to request portions of metadata from the Managing module 400 and/or the Network module 500 of either of the nodes 300*a* or 300*b* upon taking over for the node 300*a* is alleviated.

As depicted, the metadata 630*ab* may include immutable metadata 63 lab and mutable metadata 632*ab*. What pieces of metadata are included in each of the immutable metadata 63 lab and the mutable metadata 632*ab* may be based on the relative frequency with which each piece of metadata is expected to change. By way of example, aspects of the storage of client data 130 within the set of storage devices 800*ab*, such as a selection of file system, a "level" of redundancy of a Redundant Array of Independent Disks (RAID), etc. may be deemed immutable as a result of being deemed less likely to change or likely to change less frequently than other metadata. In contrast, a network address of a M-module, a N-module or a D-module of one of the other nodes 300*a-d* or 300*y-z* with which the node 300*a* may communicate via one of the interconnects 399, 599*a* or 699*ab* may be deemed mutable as a result of being deemed more likely to change or likely to change more frequently than other metadata.

As part of determining whether one of the nodes 300*a* or 300*b* needs to take over for the other, the processor components 650 of the D-modules of each of the nodes 300*a* and 300*b* may cooperate to recurringly exchange indications of the status of their nodes via the HA interconnect 699*ab* extending therebetween. As previously discussed such exchanges of status indications may take the form of recurring "heartbeat" signals and/or indications of the current state of performing an operation (e.g., a performing a data access command). Again, an indication that a component of one of the nodes 300*a-b* has suffered a malfunction may be the lack of receipt of an expected heartbeat signal or other status indication by the other of the nodes 300*a-b* within a specified period of time (e.g., within a recurring interval of time). Where the Data module 600 of the active node 300*a* receives an indication of a failure within the inactive node 300*b*, the processor component 650 of the Data module 600 of the node 300*a* (or another component of the node 300*a*) may refrain from taking action to take over the node 300*b*, since the node 300*b* is inactive such that the node 300*b* may not be performing a task that requires a takeover of the node 300*b*.

However, where the Data module 600 of the inactive node 300*b* receives an indication of a failure within the active node 300*a*, the processor component 650 of the Data module 600 of the inactive node 300*b* (or another component of the inactive node 300*b*) may take action to take over the node 300*a*, since the node 300*a* is active to engage in communications with the client devices 100, to perform data access commands, and to cooperate with another active node to cause at least partial parallel performance of data access commands therebetween. By way of example, the processor component 650 of the Data module 600 of the node 300*b* may signal the Network module 500 of the node 300*b* to take over communications with one or more of the client devices 100 and/or may begin performing the data access commands that were performed by the processor component 650 of the Data module 600 of the node 300*a*. In taking over the performance of those data access commands, the processor component 650 of the Data module 600 of the node 300*b* may take over access to and control of the set of storage devices 800*ab* via the coupling that the Data modules 600 of both of the nodes 300*a* and 300*b* share to the set of storage devices 800*ab* through the storage interconnect 899*ab*.

Where the inactive node 300*b* does take over for the active node 300*a* in response to a failure occurring within the node 300*a*, the active and inactive roles of the nodes 300*a* and 300*b* may fully reverse, at least after the failure within the node 300*a* has been corrected. More specifically, the Managing module 400 and the Network module 500 of the node 300*b* may become active to engage in communications with the client devices 100 and/or the administration device 200 via the client interconnect 199 to receive configuration information and storage service requests, and thereby take over for the Managing module 400 and the Network module 500 of the node 300*a*, while the Managing module 400 and the Network module 500 of the node 300*a* become inactive. Similarly, the Data module 600 of the node 300*b* may become active to perform and replicate data access commands, and to transmit replica data access commands to another active node via the inter-cluster interconnect 399 to cause at least partial parallel performance of the data access commands, and thereby take over for the Data module 600 of the node 300*a*, while the Data module 600 of the node 300*a* becomes inactive. However, in becoming active, the processor component 650 of the Data module 600 of the now inactive node 300*a* may cooperate with the processor component 650 of the Data module 600 of the node 300*b* to receive new versions of the metadata 630*ab* generated within the node 300*b* and to exchange indications of status with the Data module 600 of the node 300*b* via the HA interconnect 699*ab* to determine if the node 300*a* should subsequently take over for the now active node 300*b*.

The processor components 650 of the Data modules 600 of each of the nodes 300*a* and 300*b* may designate or otherwise use a portion of corresponding ones of the memories 660 as the sync caches 639*a* and 639*b*, respectively, in communications with Data module(s) 600 of others of the nodes 300*a-d* and/or 300*y-z*. More specifically, the processor components 650 of the Data modules 600 of the nodes 300*a* and 300*b* may employ the sync caches 639*a* and 639*b*, respectively, to buffer versions of the metadata 630*ab* and/or status indications exchanged therebetween. Alternatively or additionally, the processor component 650 of the Data module 600 of the node 300*a* may maintain and employ the sync cache 639*a* to buffer replica data access commands transmitted to another active node of another HA pair of another cluster and/or indications of status of performance of those replica data access commands received from that other active node.

As the processor components 550 of Network modules 500 and the processor components 650 of Data modules 600 within active ones of the nodes 300*a-d* and 300*y-z* execute relevant portions of the control routines 540 and 640, respectively, to handle requests for storages services received from one or more of the client devices 100, each of those processor components 550 and 650 may monitor various aspects of the performance and usage of the storage cluster system 1000. By way of example, each of such processor components 550 may monitor the rates at which requests for storage services are received and relayed, the amount of time required to do so, the rate of throughput of client data 130 exchanged through active ones of the Network modules 500, and any instances in which a specified maximum or other high rate of throughput of client data 130 is reached or exceeded. Also by way of example, each of such processor components 650 may monitor the quantities of client data 130 stored within and/or amounts of storage capacity still available within associated ones of the sets of storage devices 800*ab*, 800*cd* and/or 800*yz*, data rates at which client data 130 is stored or retrieved, and any instances in which an access to one or more storage devices needed to be retried. Such processor components 550 and 650 may operate corresponding ones of the interfaces 590 and 690, respectively, to relay such information to the Managing module 400 that is in communication with the collection server 2400, either directly thereto or through another intervening Managing module 400. The one of the Managing modules 400 in communication with the collection server 2400 may, in turn, relay such information to the collection server 2400.

Figure 12:
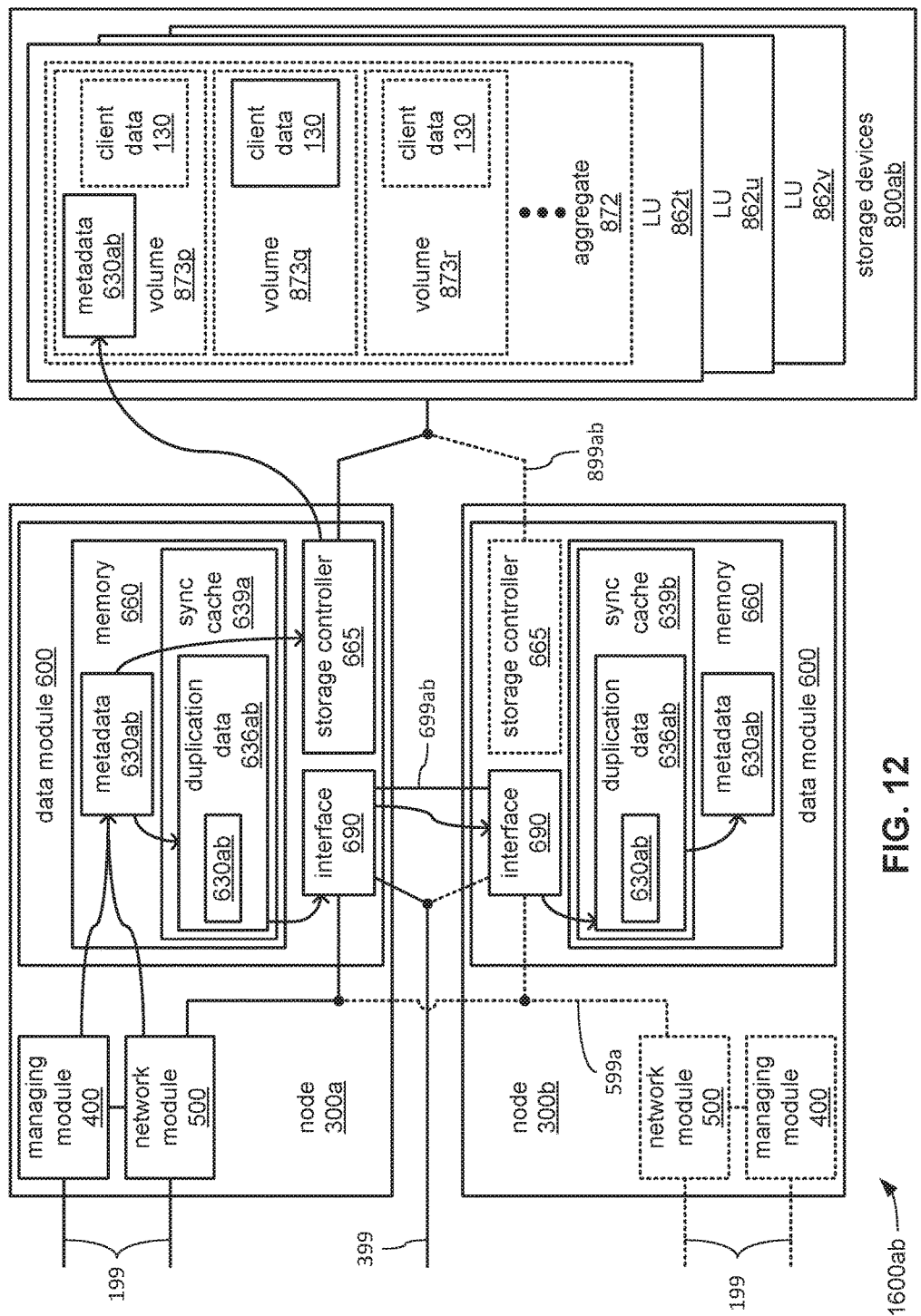
FIG. 12 illustrates an example embodiment of duplication and storage of metadata within a shared set of storage devices.

FIG. 12 illustrates a block diagram of another example embodiment of the HA group 1600*ab* of the cluster 1300*a* of the storage cluster system 1000 in greater detail. As again depicted, of the nodes 300*a* and 300*b* of the HA group 1600*ab*, the node 300*a* may be active to engage in communications with a client device 100 and/or the administration device 200, and/or may be active to perform operations altering the client data 130 within the set of storage devices 800*ab*, while the node 300*b* may be inactive and awaiting a need to take over for the node 300*a*. FIG. 12 also depicts various aspects of the generation, duplication and storage of the metadata 630ab within the set of storage devices 800ab alongside the client data 130 in greater detail.

Each of the sets of storage devices 800ab, 800cd and 800yz may be made up of storage devices based on any of a variety of storage technologies, including and not limited to, ferromagnetic "hard" or "floppy" drives, magneto-optical media drives, optical media drives (e.g., phase change, etc.), non-volatile solid state drives (e.g., NAND flash, NOR flash, etc.), etc. Further, each of the sets of storage devices 800ab, 800cd and/or 800yz maybe individual storage devices that may be based on differing storage technologies. Thus, for example, one or more of the sets of storage devices 800ab, 800cd and/or 800yz that may include a mixture of storage devices employing ferromagnetic storage technologies and storage devices employing solid state storage technologies. Still further, one or more of the individual storage devices within each of the sets of storage devices 800ab, 800cd and/or 800yz may employ a mixture of differing storage technologies (e.g., one storage technology employed as a type of cache, while another is employed as more persistent storage).

As depicted, the set of storage devices 800ab may include LUs 862t-v that may be operated together to form an array of storage devices. In some embodiments, the processor component 650 of the Data module 600 of the node 300a may operate the storage controller 665 to treat each of the storage devices of the set of storage devices 800ab as a separate LU and/or may be caused to treat a group of those storage devices as a single LU. Multiple LUs may be operated together via the storage controller 665 to implement a level of RAID or other form of array that imparts fault tolerance in the storage of data therein. The manner in which LUs are defined among one or more storage devices of the set of storage devices 800ab, and/or the manner in which multiple LUs may be operated together may be specified within the metadata 630ab.

The processor component 650 may be caused to allocate storage space in any of a variety of ways within a single LU and/or within multiple LUs operated together to form an array. In so doing, the processor component 650 may be caused to subdivide storage space in any of a variety of ways within a single LU and/or within multiple LUs that are operated together. By way of example, such subdivisions may be effected as part of organizing client data 130 into separate categories based on subject, as part of separating client data 130 into different versions generated over time, as part of implementing differing access policies to different pieces of client data 130, etc. In some embodiments, and as depicted, the storage space provided by within the LU 862t or within a combination of the LUs 862t-v may be designated as an aggregate 872. Further, the aggregate 872 may be subdivided into volumes 873p-r. The manner in which aggregates and/or volumes are defined may be selected to conform to the specification(s) of one or more widely known and used file systems, including and not limited to, Write Anywhere File Layout (WAFL). The manner in which aggregates and/or volumes within aggregates are allocated among a single LU or multiple LUs that are operated together may be specified within the metadata 630ab.

The client data 130 may be stored entirely within one of the volumes 873p-r, or may be distributed among multiple ones of the volumes 873p-r (as depicted). As also depicted, the metadata 630ab may also be stored within the set of storage devices 800ab along with client data 130, at least within the same aggregate 872. In some embodiments, the metadata 630ab may be stored within one or more of the same volumes 873p-r as client data 130 (as depicted). In other embodiments, the metadata 630ab may be stored within one of the volumes 873p-r that is separate from one or more others of the volumes 873p-r within which client data 130 may be stored. The manner in which the metadata 630ab and/or the client data 130 are to be organized within aggregates and/or values may be specified within the metadata 630ab itself.

As previously discussed, the Managing module 400 of the active node 300a may provide portions of metadata, including updates thereof, to the Network module 500 and/or the Data module 600 in response to receiving configuration information from one of the client devices 100. Again, such portions of metadata so provided by the Managing module 400 (and/or updates thereto) may include configuration information received in configuration data from the administration device 200 and/or one or more of the client devices 100. Also, the Network module 500 of the active node 300a may provide portions of metadata, including updates thereof, to the Data module 600 that indicate results of various tests performed by the Network module 500. Again, the portions of metadata so provided by the Network module 500 (and/or updates thereto) may include configuration information derived by the Network module 500 through the performance of various tests. And again, a duplicate of the metadata 630ab may be generated and stored within the sync cache 639a as a portion of duplication data 636ab, by which the duplicate of the metadata 630ab may be transmitted via the interface 690 and the HA interconnect 699ab to the Data module 600 of the inactive node 300b.

As the processor component 650 of the Data module 600 of one or more of the active nodes 300a-d and 300y-z are caused to create aggregates and/or volumes in corresponding ones of the sets of storage devices 800ab, 800cd and 800yz, those processor components 650 may monitor the process of doing so and record various results of those processes, such as failures in particular storage devices, instances of needing to resize one aggregate or volume to accommodate an expansion of another, and instances of automatically increasing the size of a volume or aggregate as a result of the storage of a larger quantity of client data 130 than could be accommodated by the original defined capacity of that volume or aggregate. Again, those ones of the processor component 650 may operate corresponding ones of the interfaces 690 to relay such information to the one of the Managing modules 400 that is in communication with the collection server 2400 to be relayed thereto.

Figure 13:
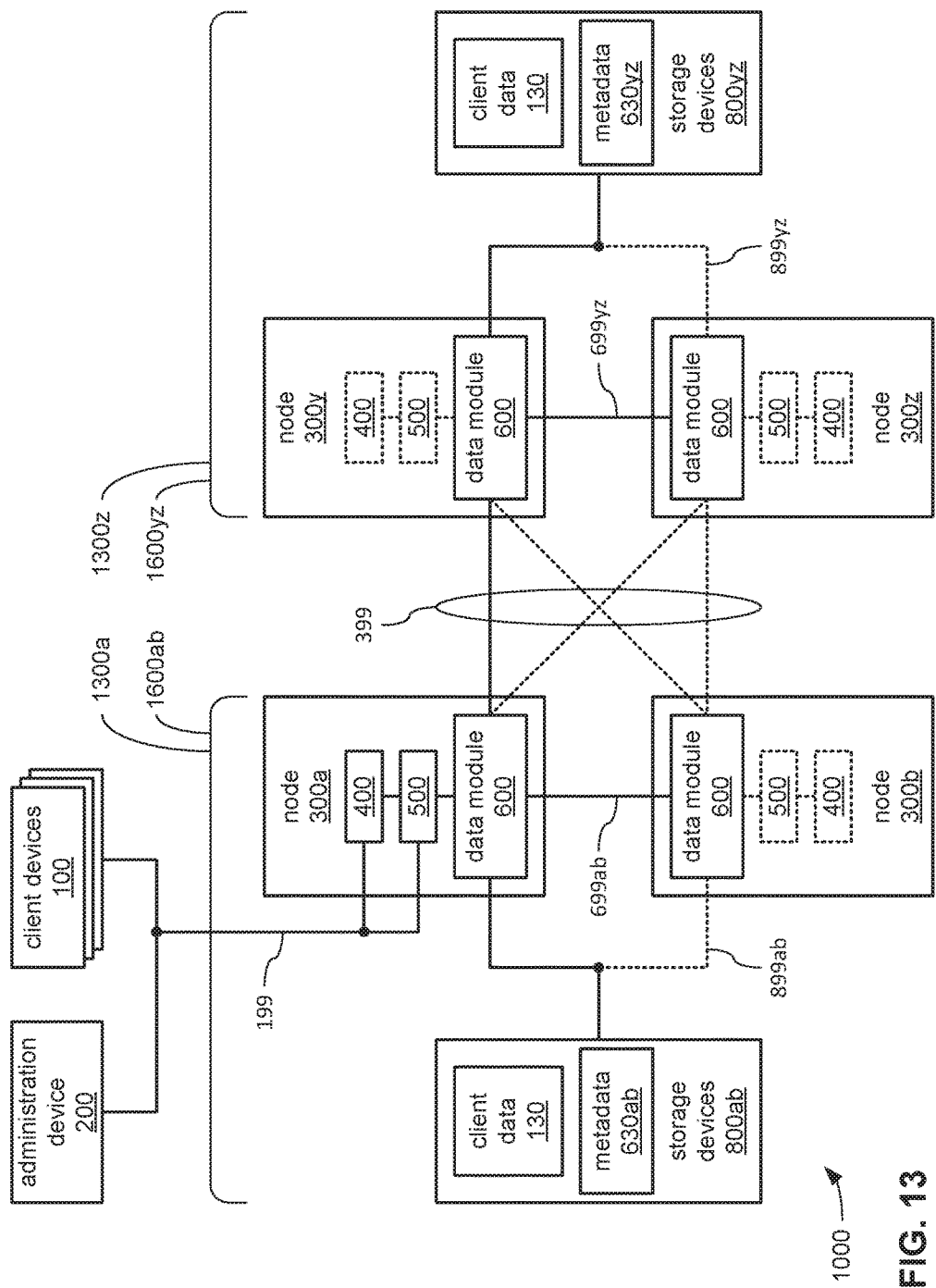
FIG. 13 illustrates an example embodiment of a mesh of communications sessions among nodes.

FIG. 13 depicts an example embodiment of a mesh of communications sessions formed among the nodes 300a-b and 300y-z through the inter-cluster interconnect 399 in greater detail. More specifically, through the inter-cluster interconnect 399, each of the nodes 300a and 300b of the HA group 1600ab forms a communications session with each of the nodes 300y and 300z of the HA group 1600yz, thereby forming the depicted mesh of communications sessions among the nodes 300a-b and 300y-z. As depicted, of these communications sessions, the communications session extending between the nodes 300a and 300y may be an active communications session (as indicated with a solid line), while the others of these communications sessions may be inactive communications sessions (as indicated with dotted lines). This reflects the fact that the nodes 300a and 300y, at least initially, are each the active nodes of the HA groups 1600ab and 1600yz, respectively, that engage in communications to exchange replica data access commands and associated data to enable at least partly parallel performance of data access commands between the HA groups 1600ab and 1600yz.

Thus, during normal operation of the storage cluster system 1000 in which the nodes 300a and 300y are active nodes and no errors occur within either of the nodes 300a or 300y, a request for storage services is received by the node 300a via the client interconnect 199 from one of the client devices 100. Following conversion of the storage services request into a data access command by the Network module 500 of the node 300a, the Data module 600 of the node 300a may both begin performance of the data access command and transmit a replica of that data access command to the node 300y via the active communications session formed through inter-cluster interconnect 399 between the nodes 300a and 300y. The Data module 600 of the node 300y may then perform the replica data access command at least partly in parallel with the performance of the data access command by the Data module 600 of the node 300a.

In preparation for such a transmission, the Data module 600 of the node 300a may cooperate with the Data module 600 of the node 300y to form the depicted active communications session between the nodes 300a to 300y through an exchange of messages requesting and accepting formation of the active communications session. Following its formation, the Data modules 600 of the nodes 300a and 300y may cooperate to maintain the active communications session by recurring exchanges of test signals (e.g., test messages) therethrough to monitor the state of the active communications session.

In addition to the Data modules 600 of the nodes 300a and 300y cooperating to form and maintain the depicted active communications session through the inter-cluster interconnect 399 to support such exchanges of replica data access commands, the Data modules 600 of all of the nodes 300a-b and 300y-z may cooperate to form and maintain the depicted inactive communications sessions through the inter-cluster interconnect 399 in preparation for handling an error condition affecting one of the nodes 300a or 300y. More specifically, test signals (e.g., test messages) may be exchanged through one or more of the inactive communications sessions to monitor their state.

In the event of a failure of at least a portion of the node 300a, the node 300b may take over for the node 300a, and in so doing, may change the state of the inactive communications session extending between the Data modules 600 of the nodes 300b and 300y into an active communications session. By doing so, the node 300b becomes able to transmit replica data access commands to the node 300y in place of the node 300a. Correspondingly, in the event of a failure of at least a portion of the node 300y, the node 300z may take over for the node 300y, and in so doing, may change the state of the inactive communications session extending between the Data modules 600 of the nodes 300a and 300z into an active communications session. By doing so, the node 300z becomes able to receive and perform replica data access commands from the node 300a in place of the node 300y. In either of these events, the active communications session extending between the D-modules of the nodes 300a and 300y may become inactive. In some embodiments, indications of such changes in which communication sessions are active and/or inactive may be relayed to the one of the Managing modules 400 that is in communication with the collection server 2400 to enable those indications to be relayed onward to the collection server 2400 alongside indications of which communication sessions were originally configured to be active, at least by default.

In various embodiments, each of the processor components 450, 550, 650, 2450, 2550 and 2650 may include any of a wide variety of commercially available processors. Also, one or more of these processor components may include multiple processors, a multi-threaded processor, a multi-core processor (whether the multiple cores coexist on the same or separate dies), and/or a multi processor architecture of some other variety by which multiple physically separate processors are in some way linked hi various embodiments, one or more of the control routines 440, 540, 640, 2440, 2540 and 2640 may include one or more of an operating system, device drivers and/or application-level routines (e.g., so-called "software suites" provided on disc media, "applets" obtained from a remote server, etc.). As recognizable to those skilled in the art, each of the control routines 440, 540 and 640, including the components of which each may be composed, are selected to be operative on whatever type of processor or processors may be selected to implement applicable ones of the processor components 450, 550 or 650, or to be operative on whatever type of processor or processors may be selected to implement a shared processor component. In particular, where an operating system is included, the operating system may be any of a variety of available operating systems appropriate for corresponding ones of the processor components 450, 550 or 650, or appropriate for a shared processor component. Also, where one or more device drivers are included, those device drivers may provide support for any of a variety of other components, whether hardware or software components, of corresponding ones of the modules 400, 500 or 600.

In various embodiments, one or more the memories 460, 560, 660, 2460, 2560 and 2660, as well as the storage devices making up one or more of the sets of storage devices 800ab, 800cd and 800yz, may be based on any of a wide variety of information storage technologies, possibly including volatile technologies requiring the uninterrupted provision of electric power, and possibly including technologies entailing the use of machine-readable storage media that may or may not be removable. Thus, each of these memories may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, solid state disk drives, or a plurality of storage devices organized into one or more arrays (e.g., multiple ferromagnetic disk drives and/or solid state disk drives organized into a RAID array). It should be noted that although each of these memories is depicted as a single block, one or more of these may include multiple storage devices that may be based on differing storage technologies. Thus, for example, one or more of each of these depicted memories may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these memories may be made up of multiple storage components based on identical storage technology, but which may be maintained separately as a result of specialization in use (e.g., some DRAM devices employed as a main memory while other DRAM devices employed as a distinct frame buffer of a graphics controller).

In various embodiments, one or more of the interfaces 490, 590, 690, 2490, 2590 and 2690 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 14:
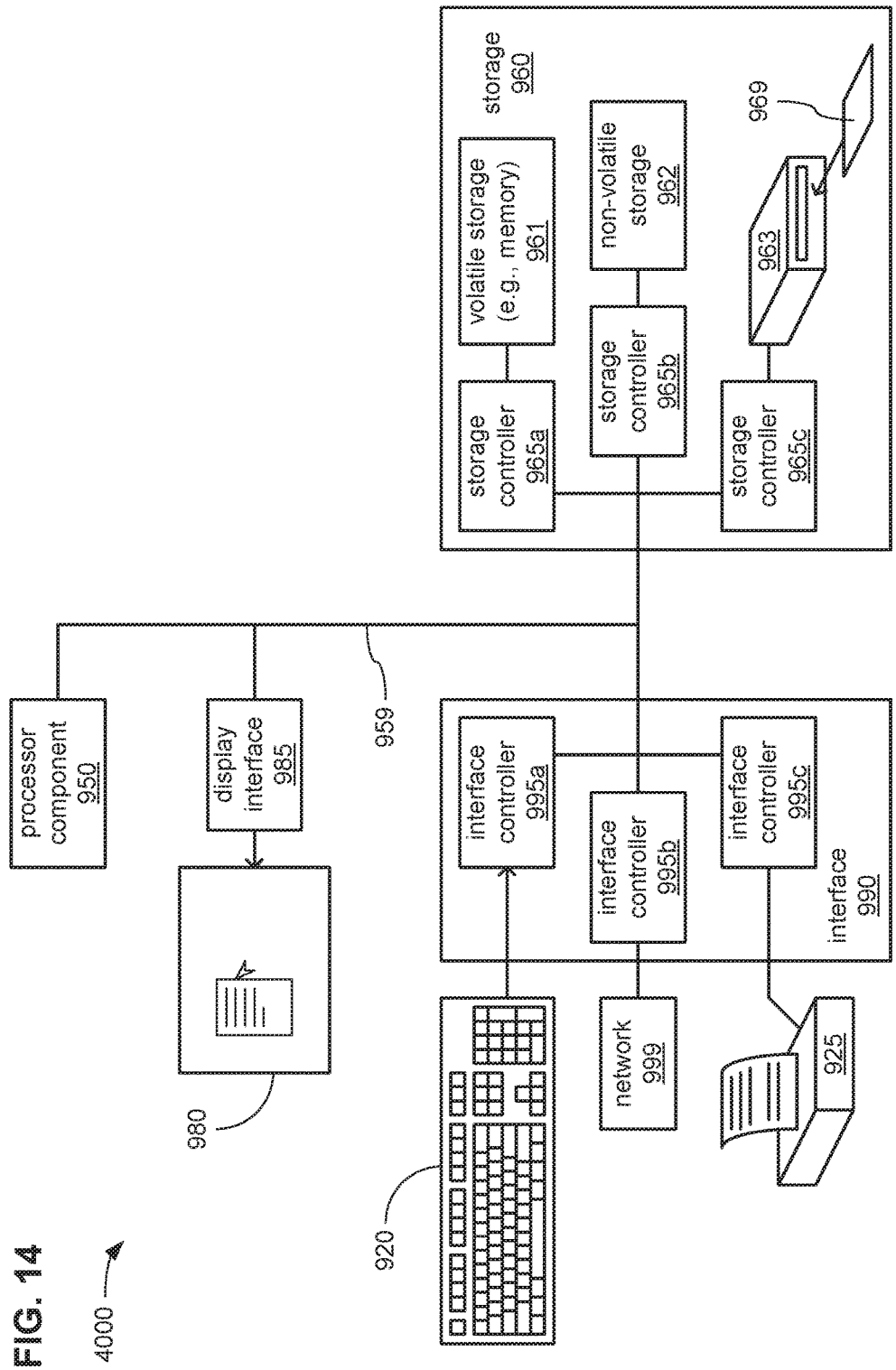
FIG. 14 illustrates a processing architecture according to an embodiment.

FIG. 14 illustrates an embodiment of an exemplary processing architecture 4000 suitable for implementing various embodiments as previously described. More specifically, the processing architecture 4000 (or variants thereof) may be implemented as part of one or more of the client devices 100, the administration devices 200, the nodes 300, the management modules 400, the network modules 500, the data modules 600, the authoring devices 2100, the administration devices 2200, the collection server 2400, the analysis server 2500, the visualization server 2600, the documentation server 2800, and the sets of storage devices 800ab, 800cd or 800yz. It should be noted that components of the processing architecture 4000 are given reference numbers in which the last two digits correspond to the last two digits of reference numbers of at least some of the components earlier depicted and described as part of the devices 100, 200, 800, 2100 and/or 2200; the servers 2400, 2500, 2600 and/or 2800; and/or the modules 400, 500 and 600. This is done as an aid to correlating components of each.

The processing architecture 4000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 4000, a computing device includes at least a processor component 950, an internal storage 960, an interface 990 to other devices, and a coupling 959. As will be explained, depending on various aspects of a computing device implementing the processing architecture 4000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the internal storage 960. Coupling 959 may further couple the processor component 950 to one or more of the interface 990 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 4000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 may include any of a wide variety of commercially available processors, employing any of a wide variety of technologies and implemented with one or more cores physically combined in any of a number of ways.

As previously discussed, the internal storage 960 may be made up of one or more distinct storage devices based on any of a wide variety of technologies or combinations of technologies. More specifically, as depicted, the internal storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the internal storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for long-term storage not requiring the continuing presence of the machine-readable storage medium 969 and/or the volatile storage 961 to enable more rapid access by the processor component 950 as that routine is executed.

As previously discussed, the interface 990 may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface controller 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 4000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The invention claimed is:

1. An apparatus comprising:
a processor component;
a model derivation component to derive a model that correlates level of usage of a node to latency of data propagation through the node and to resource utilization of the node from a first model associated with a first node of a storage cluster system and a second model associated with a second node of the storage cluster system, the first model generated based on operation of the first node at a first usage level under a first usage type, and the second model generated based on operation of the second node at a second usage level under a second usage type; and
an analysis component to determine whether the first node is currently able to take over for the second node based on an application of a total usage level to the derived model, the total usage level derived from the first and second usage levels; wherein in response to an indication of at least the determination of whether the first node is able to take over for the second node, the first node taking over the second node upon failure of a portion of the second node.

2. The apparatus of claim 1, comprising a usage separation component to separate the first usage level into a first internal portion associated with performance of processes internal to the first node to maintain operation of the first node from a first external portion associated with performance of input/output operations (IOPs) of a storage service request, and to separate the second usage level into a second internal portion associated with performance of processes internal to the second node to maintain operation of the second from a second external portion associated with performance of IOPs of the storage service request, the storage service request comprising a request received by the storage cluster system to store or retrieve client data.

3. The apparatus of claim 2, the analysis component to compare the first and second internal portions to identify which of the first and second internal portions is greater, and to generate the total usage level from a sum of the first external portion, the second external portion, and the greater of the first and second internal portions.

4. The apparatus of claim 2, comprising a retrieval component to retrieve first and second data points transmitted by the storage cluster system, the first data point to indicate the operation of the first node at the first usage level under the first usage type, and the second data point to indicate the operation of the second node at the second usage level under the second usage type.

5. The apparatus of claim 1, comprising an augmenting component to generate the first model based on at least a first data point and to generate the second model based on at least a second data point, the first data point to indicate the operation of the first node at the first usage level under the first usage type, and the second data point to indicate the operation of the second node at the second usage level under the second usage type.

6. The apparatus of claim 5, comprising a comparison node to compare a first combination of a node type of the first node and the first usage type to a second combination of another node type and a third usage type indicated in a third data point, the augmenting component to augment the first model based on the third data point in response to the first and second combinations differing to a degree within a predetermined maximum difference threshold.

7. The apparatus of claim 5, the augmenting component to store the first and second models in a model database.

8. The apparatus of claim 1, the analysis component to store an indication of the determination of whether the first node is currently able to take over for the second node in results database that stores multiple indications of prior determinations of whether the first node is able to take over for the second node, and the apparatus comprising a results notification component to transmit, via network to an administration device, an indication of whether a frequency of determinations that the first node is not able to take over for the second node exceeds a threshold.

9. A computer-implemented method comprising:
deriving a model that correlates level of usage of a node to latency of data propagation through the node and to resource utilization of the node from a first model associated with a first node of a storage cluster system and a second model associated with a second node of the storage cluster system, the first model generated based on operation of the first node at a first usage level under a first usage type, and the second model generated based on operation of the second node at a second usage level under a second usage type;
determining whether the first node is currently able to take over for the second node based on a application of a total usage level to the derived model, the total usage level derived from the first and second usage levels;
transmitting an indication of at least the determination of whether the first node is able to take over for the second node to an administration device through a network; and
in response to the indication, the first node taking over the second node upon failure of a portion of the second node.

10. The computer-implemented method of claim 9, comprising:
receiving, through the network, a first data point transmitted by the storage cluster system that indicates the operation of the first node at the first usage level under the first usage type, and a second data point transmitted by the storage cluster system that indicates operation of the second node at the second usage level under the second usage type;
separating the first usage level into a first internal portion associated with performance of processes internal to the first node to maintain operation of the first node from a first external portion associated with performance of input/output operations (IOPs) of a storage service request, the storage service request comprising a request received by the storage cluster system to store or retrieve client data; and
separating the second usage level into a second internal portion associated with performance of processes internal to the second node to maintain operation of the second from a second external portion associated with performance of IOPs of the storage service request.

11. The computer-implemented method of claim 10, comprising:
comparing the first and second internal portions to identify which of the first and second internal portions is greater; and
generating the total usage level from a sum of the first external portion, the second external portion, and the greater of the first and second internal portions.

12. The computer-implemented method of claim 9, comprising:
receiving, through the network, a first data point transmitted by the storage cluster system that indicates the operation of the first node at the first usage level under the first usage type, and a second data point transmitted by the storage cluster system that indicates operation of the second node at the second usage level under the second usage type;
generating the first model based on at least the first data point; and
generating the second model based on at least the second data point.

13. The computer-implemented method of claim 12, comprising:
comparing a first combination of a node type of the first node and the first usage type to a second combination of another node type and a third usage type indicated in a third data point; and
augmenting the first model based on the third data point in response to the first and second combinations differing to a degree within a predetermined maximum difference threshold.

14. The computer-implemented method of claim 13, comprising:
storing the first and second models in a model database; and
augmenting the first model, as stored in the model database, based on the third data point.

15. The computer-implemented method of claim 9, the derived model indicating a point of diminishing returns in the correlation of the level of usage to latency of data propagation and resource utilization as the level of usage continues to increase, the method comprising determining whether the first node is currently able to take over for the second node based on whether the total usage level exceeds the point of diminishing returns.

16. At least one non-transitory machine-readable storage medium comprising instructions that when executed by a processor component, cause the processor component to:
derive a model that correlates level of usage of a node to latency of data propagation through the node and to resource utilization of the node from a first model associated with a first node of a storage cluster system and a second model associated with a second node of the storage cluster system, the first model generated based on operation of the first node at a first usage level under a first usage type, and the second model generated based on operation of the second node at a second usage level under a second usage type;
determine whether the first node is currently able to take over for the second node based on a application of a total usage level to the derived model, the total usage level derived from the first and second usage levels;
transmit an indication of at least the determination of whether the first node is able to take over for the second node to an administration device for presentation through a network; and
in response to the indication, the first node takes over the second node upon failure of a portion of the second node.

17. The at least one non-transitory machine-readable storage medium of claim 16, the processor component caused to:
receive a first data point transmitted by the storage cluster system that indicates the operation of the first node at the first usage level under the first usage type, and a second data point transmitted by the storage cluster system that indicates operation of the second node at the second usage level under the second usage type;

separate the first usage level into a first internal portion associated with performance of processes internal to the first node to maintain operation of the first node from a first external portion associated with performance of input/output operations (IOPs) of a storage service request, the storage service request comprising a request received by the storage cluster system to store or retrieve client data; and separate the second usage level into a second internal portion associated with performance of processes internal to the second node to maintain operation of the second from a second external portion associated with performance of IOPs of the storage service request.

18. The at least one non-transitory machine-readable storage medium of claim 17, the processor component caused to:

compare the first and second internal portions to identify which of the first and second internal portions is greater; and generate the total usage level from a sum of the first external portion, the second external portion, and the greater of the first and second internal portions.

19. The at least one non-transitory machine-readable storage medium of claim 16, the processor component caused to:

receive, through the network, a first data point transmitted by the storage cluster system that indicates the operation of the first node at the first usage level under the first usage type, and a second data point transmitted by the storage cluster system that indicates operation of the second node at the second usage level under the second usage type;

generate the first model based on at least the first data point; and generate the second model based on at least the second data point.

20. The at least one non-transitory machine-readable storage medium of claim 19, the processor component caused to:

compare a first combination of a node type of the first node and the first usage type to a second combination of another node type and a third usage type indicated in a third data point; and augment the first model based on the third data point in response to the first and second combinations differing to a degree within a predetermined maximum difference threshold.

21. The at least one non-transitory machine-readable storage medium of claim 16, the derived model indicating a point of diminishing returns in the correlation of the level of usage to latency of data propagation and resource utilization as the level of usage continues to increase, and the processor component caused to determine whether the first node is currently able to take over for the second node based on whether the total usage level exceeds the point of diminishing returns.

22. The at least one non-transitory machine-readable storage medium of claim 21, the first model indicating a first point of diminishing returns and the second model indicating a second point of diminishing returns, and the processor component caused to derive the derived model from a combination of the first and second models or by selecting one of the first and second models to become the derived model based on a comparison of usage levels at which the first point of diminishing returns and the second point of diminishing returns is more exceeded.

* * * * *